(12) United States Patent
Ohta et al.

(10) Patent No.: US 7,423,505 B2
(45) Date of Patent: Sep. 9, 2008

(54) ACTUATOR

(75) Inventors: Masahiro Ohta, Wako (JP); Toru Sukigara, Wako (JP)

(73) Assignee: Honda Giken Kogya Kabushiki Kaisha, Tokyo (JP)

( * ) Notice: Subject to any disclaimer, the term of this patent is extended or adjusted under 35 U.S.C. 154(b) by 424 days.

(21) Appl. No.: 10/517,465

(22) PCT Filed: Jun. 2, 2003

(86) PCT No.: PCT/JP03/06928

§ 371 (c)(1),
(2), (4) Date: Dec. 6, 2004

(87) PCT Pub. No.: WO03/105322

PCT Pub. Date: Dec. 18, 2003

(65) Prior Publication Data

US 2006/0044093 A1 Mar. 2, 2006

(30) Foreign Application Priority Data

Jun. 5, 2002 (JP) .............................. 2002-163850

(51) Int. Cl.
*H01F 7/08* (2006.01)
(52) U.S. Cl. .................. 335/220; 335/229; 335/274
(58) Field of Classification Search .................... 335/35, 335/43, 220, 229, 274
See application file for complete search history.

(56) References Cited

U.S. PATENT DOCUMENTS

| 4,275,370 | A | * | 6/1981 | Sims | 335/37 |
| 5,001,446 | A | * | 3/1991 | Tsuji et al. | 335/43 |
| 5,055,725 | A | * | 10/1991 | LaSota | 310/14 |
| 5,107,235 | A | * | 4/1992 | Torres-Isea | 335/35 |

FOREIGN PATENT DOCUMENTS

| EP | 147278 A2 | * | 7/1985 |
| JP | 60143609 A | * | 7/1985 |
| JP | 02107880 A | * | 4/1990 |
| JP | 02291627 A | * | 12/1990 |
| JP | 10-223430 | | 8/1998 |
| JP | 11-269611 | | 10/1999 |
| JP | 2000-297566 | | 10/2000 |

* cited by examiner

*Primary Examiner*—Ramon M Barrera
(74) *Attorney, Agent, or Firm*—Lahive & Cockfield, LLP; Anthony A. Laurentano, Esq.

(57) ABSTRACT

An actuator has a resilient shape memory member 1 with superelasticity, a magnetic body 2, and a magnetic field generator 3. At least one of the magnetic body 2 and the magnetic field generator 3 is fixed to the resilient shape memory member 1 such that one of the magnetic body 2 and the magnetic field generator 3 is stationary while the other is movable, whereby the movable member is moved by a magnetic field provided from the magnetic field generator 3.

1 Claim, 17 Drawing Sheets

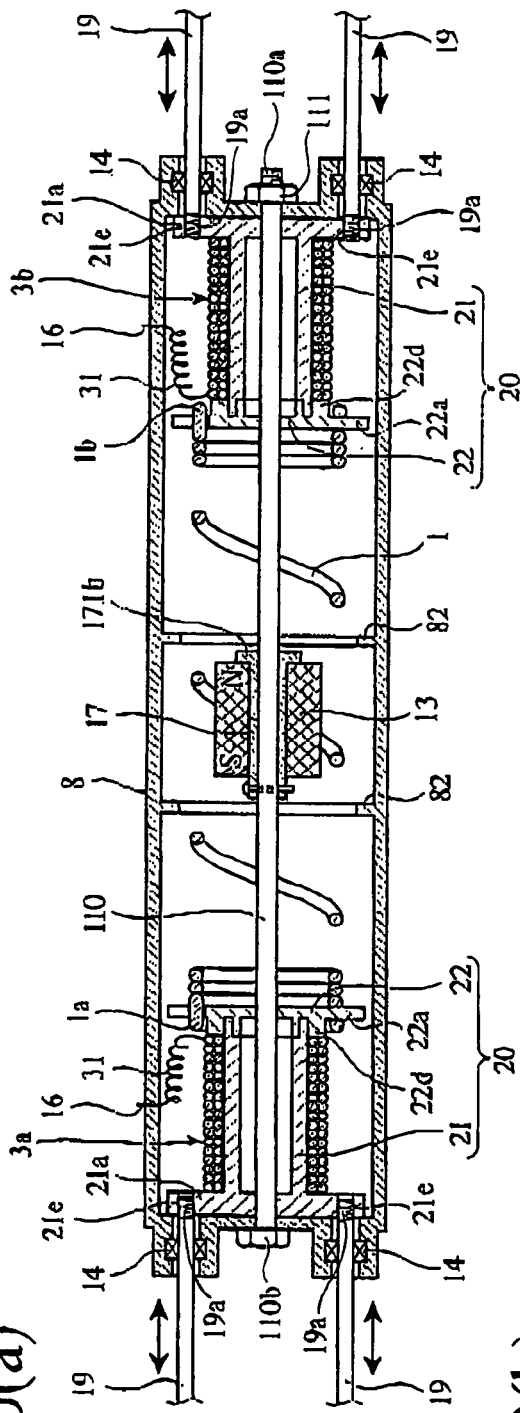
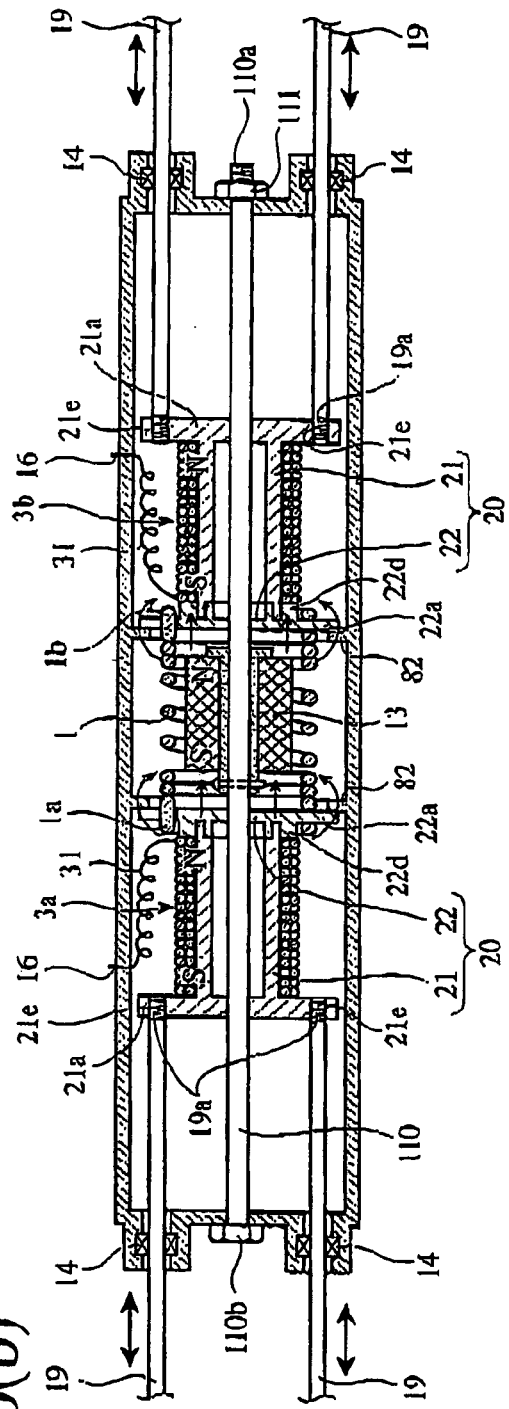
Fig. 20(a)
Fig. 20(b)

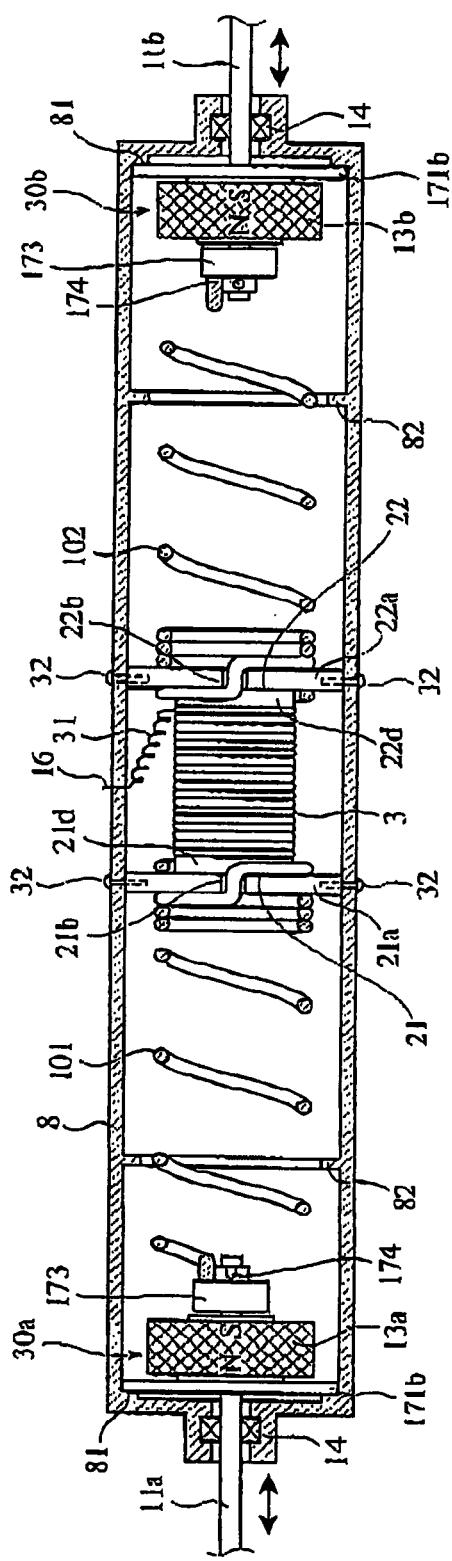
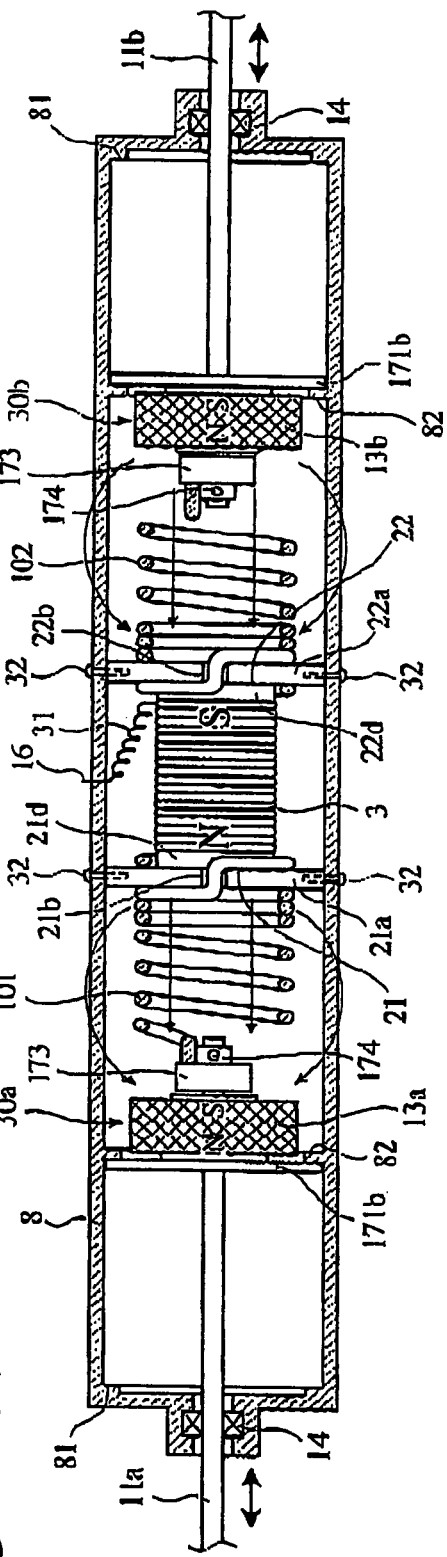
Fig. 21(a)
Fig. 21(b)

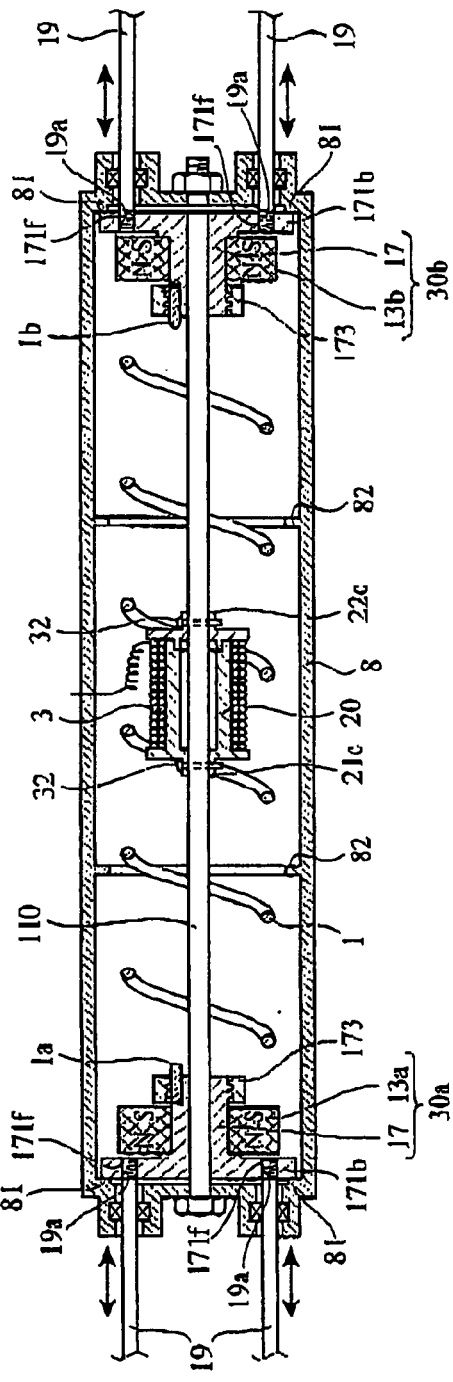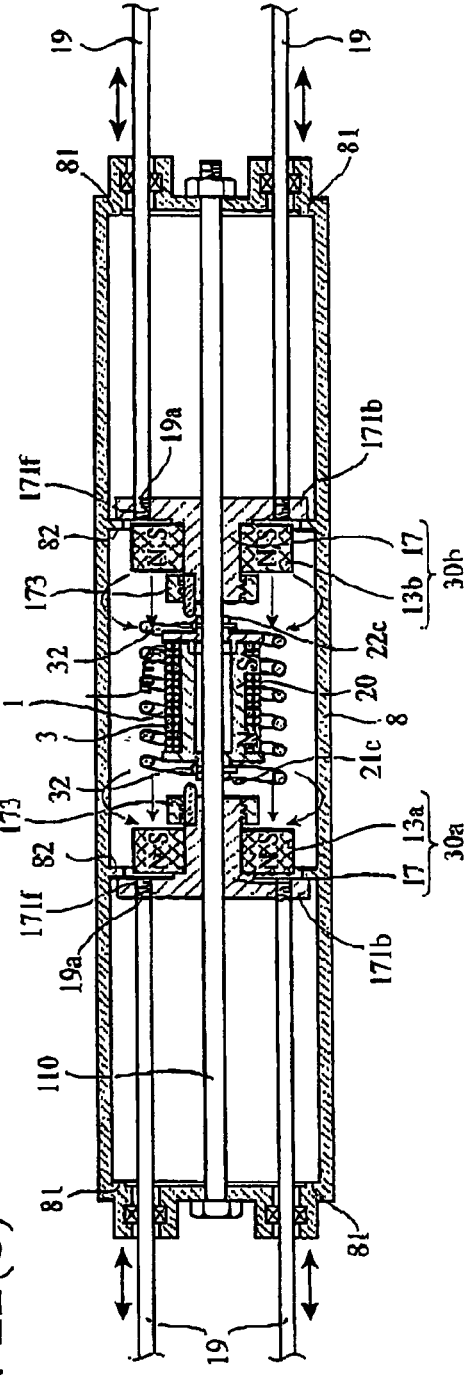
Fig. 22(a)
Fig. 22(b)

ACTUATOR

RELATED APPLICATIONS

This application is a 35 U.S.C. 371 national stage filing of International Application No. PCT/JP03/06928, filed 2 Jun. 2003, which claims priority to Japanese Patent Application No. 2002-163850 filed on 5 Jun. 2002 in Japan. The contents of the aforementioned applications are hereby incorporated by reference.

FIELD OF THE INVENTION

The present invention relates to a high-response actuator, which utilizes the superelasticity of a shape memory alloy and a magnetic force to move a movable member.

BACKGROUND OF THE INVENTION

In the fields of robots, working machines, automobiles, etc. using electromagnetic motors, the weight reduction of driving systems is demanded. However, because the output densities of the electromagnetic motors depend on their weight, only limited weight reduction is available in actuators comprising the electromagnetic motors. It has thus been desired to develop a small-sized, lightweight actuator capable of providing high output.

Actuators should satisfy such conditions that movable members are displaced to desired positions by a driving force; that the movable members are surely returned to original positions in a nonoperative state; that sufficiently large output is provided to enable the movable members to move even under a large load; etc. Springs are used as pressing members for the movable members to bring them back to the original positions in a nonoperative state. In a case where springs have large resiliency, a large driving force is needed to move the movable member against the spring force. It is thus desired that the springs be deformed by a slight force.

Springs made of superelastic shape memory alloys have recently attracted much attention as resilient members that can be deformed by a slight force, and they have been used for various products such as guide wires of catheters. Thus, attempts have been made to use the shape memory alloy springs for the pressing members of the movable members in the actuators.

However, the conventional actuators comprising shape memory alloy springs, which have a mechanism of deforming the springs by temperature change utilizing the thermoelastic martensitic phase transformation of the shape memory alloys, suffer from slow response because thermal diffusion determines the rate of deformation, though the actuators provide large output and displacement.

It may be contemplated to deform the springs not by temperature change but by a magnetic force. For example, it is known that Ni—Mn—Ga alloy undergo phase transformation in a magnetic field. However it is difficult to form this alloy into springs because of brittleness. JP 11-269611 A proposes, as a magnetic shape memory alloy free from such a difficulty, an iron-based magnetic shape memory alloy such as an iron-palladium alloy containing 27 to 32 atomic % of palladium, and an iron-platinum alloy containing 23 to 30 atomic % of platinum, etc., which are subjected to martensitic phase transformation by external magnetic field energy. Though this shape memory alloy exhibits excellent response because of magnetic control, it disadvantageously needs a larger magnetic field.

Further, JP 10-223430 A proposes, as an actuator utilizing the superelasticity of a shape memory alloy, a magnetic-drive stage comprising a square-shaped, parallel shape memory alloy spring composed of a parallel movable member and a pair of beams perpendicular thereto; a pair of electromagnets disposed on both sides of the parallel spring for driving the parallel spring by a magnetic force; and a permanent magnet for supporting the parallel spring by a magnetic force, each beam comprising hinges with reduced width for easy deformation, and the permanent magnet applying an attractive force to the hinges. Though this magnetic-drive stage can achieve high-accuracy positioning, it provides only small displacement because of using the parallel spring.

As an actuator using the superelasticity of a shape memory alloy, JP 2000-297566 A proposes a driving apparatus comprising a shape memory alloy member that is energized to show superelasticity; a movable member connected to the shape memory alloy member, which is displaced from a stop position to a predetermined active position by energizing and compressing the shape memory alloy member with a spring structure; and a lock mechanism. The movable member of this driving apparatus is maintained at the active position by the lock mechanism. When the driving apparatus is unlocked while the shape memory alloy member is not energized, the movable member is returned to the stop position by a tension coil spring connected to the movable member. This driving apparatus fails to achieve high-accuracy position control, despite positioning by the lock mechanism and the spring.

OBJECT OF THE INVENTION

Accordingly, an object of the present invention is to provide a precisely controllable actuator capable of providing large displacement and output with excellent response in a small magnetic field.

SUMMARY OF THE INVENTION

As a result of intense research in view of the above object, the inventors have found that the use of a resilient shape memory member having superelasticity as a movable-member-pressing member and an attractive/repulsive force between an electromagnetic coil and a magnetic body for moving the movable member provides an actuator with good response, large displacement and output in a small magnetic field, and precise control. The present invention has been completed based on this finding.

Thus, the actuator of the present invention comprises a resilient shape memory member with superelasticity, a magnetic body, and a magnetic field generator, at least one of the magnetic body and the magnetic field generator being fixed to the resilient shape memory member, such that one of the magnetic body and the magnetic field generator is stationary while the other is movable, whereby the movable member is moved by a magnetic field provided from the magnetic field generator.

It is preferred that the magnetic body is attached to an end of the resilient shape memory member or covers at least part of the resilient shape memory member. The resilient shape memory member is preferably a coil spring or a plate spring.

In a first embodiment of the present invention, the actuator comprises a pair of ring-shaped magnetic bodies, a movable member disposed between the magnetic bodies movably in their axial direction, a magnetic field generator provided in the movable member, resilient shape memory members each disposed between the movable member and each magnetic body, a frame for supporting the magnetic bodies, and a shaft fixed to the movable member, extending through the center bores of the magnetic bodies and slidably supported by both ends of the frame, the magnetic field generator being energized to generate a magnetic attractive or repulsive force between the magnetic field generator and the magnetic bodies to move the movable member.

In a second embodiment of the present invention, the actuator comprises a pair of magnetic field generators, a pair of movable members each comprising each magnetic field generator, a magnetic body disposed between the movable members in their moving direction, a resilient shape memory member disposed between the movable members, a shaft for fixing the magnetic body and slidably supporting the movable members, a frame for fixing the shaft, and output rods fixed to each movable member and slidably supported by the frame, the magnetic field generators being energized to generate a magnetic attractive or repulsive force between the magnetic field generators and the magnetic body to move the movable members.

In the first and second embodiments, the frame preferably comprises stoppers near the magnetic body (bodies) to regulate the movable range of the movable member.

In a third embodiment of the present invention, the actuator comprises a pair of magnetic field generators, a movable member disposed between the magnetic field generators movably in their axial direction, a ring-shaped magnetic body provided in the movable member, a pair of resilient shape memory members each disposed between the movable member and each magnetic field generator, a frame for supporting the magnetic field generators, and a shaft fixed to the movable member and slidably supported by both ends of the frame, the magnetic field generators being energized to generate a magnetic attractive or repulsive force between the magnetic field generators and the magnetic body to move the movable member.

In the third embodiment, the frame preferably comprises a stopper near the magnetic field generator to regulate the movable range of the movable member.

In a fourth embodiment of the present invention, the actuator comprises a pair of ring-shaped magnetic bodies, a pair of movable members each comprising each magnetic body, a magnetic field generator disposed between the movable members in their moving direction, a pair of resilient shape memory members each disposed between the magnetic field generator and each magnetic body, a frame for supporting the magnetic field generator, and a shaft fixed to each movable member, extending through a center bore of the magnetic body and slidably supported by an end of the frame, the magnetic field generator being energized to generate a magnetic attractive or repulsive force between the magnetic field generator and the magnetic bodies to move the movable members.

In a fifth embodiment of the present invention, the actuator comprises a pair of ring-shaped magnetic bodies, a pair of movable members each comprising each magnetic body, a magnetic field generator disposed between the movable members in their moving direction, a resilient shape memory member disposed between the movable members, a shaft for fixing the magnetic field generator and slidably supporting the movable members, a frame for fixing the shaft, and output rods fixed to each movable member and slidably supported by the frame, the magnetic field generator being energized to generate a magnetic attractive or repulsive force between the magnetic field generator and the magnetic bodies to move the movable members.

In the fourth and fifth embodiments, the frame preferably comprises stoppers to regulate the movable range of the movable member.

In the third to fifth embodiments, it is preferred that the movable member comprises a support member for fixing the magnetic body, the support member comprising a large-diameter portion for supporting the magnetic body, a flange on an end of the large-diameter portion, and an external thread portion, onto which a cylindrical nut is screwed. The external thread portion has a groove, into which an end portion of the resilient shape memory member is inserted. The groove has such depth that the end portion of the inserted resilient shape memory member slightly protrudes from the groove of the external thread portion, and the end portion of the inserted resilient shape memory member is firmly fixed to the support member by screwing the nut onto the external thread portion.

The support member is preferably an integral plastic molding. The external thread portion of the support member is preferably tapered complementarily to the nut. The magnetic body is preferably a permanent magnet.

In any of the above embodiments, the resilient shape memory member is preferably made of a Ni—Ti alloy.

BRIEF DESCRIPTION OF THE DRAWINGS

FIG. 8(*c*) shows the magnetic field generator energized to move in the other direction;

FIG. 9(*b*) shows the magnetic field generator energized to move in one direction;

FIG. 9(*c*) shows the magnetic field generator energized to move in the other direction;

FIG. 10(*b*) shows the magnetic field generator energized to move in one direction;

FIG. 11(*b*) shows the permanent magnet, which is moved by energizing a magnetic field generator;

FIG. 12(*b*) shows that the energized magnetic field generator is moving;

FIG. 12(*c*) shows that the energized magnetic field generator engages the other stopper;

FIG. 18(*b*) shows the permanent magnet, which is moved by energizing magnetic field generators;

FIG. 18(*c*) shows the flange of the movable member engaging the other stopper;

FIG. 19(*b*) is an enlarged cross-sectional view showing the movable member;

FIG. 20(*a*) is a cross-sectional view showing a further specific example of the actuator of the present invention, in which a magnetic field generator is not energized;

FIG. 20(*b*) shows the magnetic field generator, which is energized;

FIG. 21(*a*) is a cross-sectional view showing a still further specific example of the actuator of the present invention, in which a magnetic field generator is not energized;

FIG. 21(*b*) shows the magnetic field generator, which is energized;

FIG. 22(*a*) is a cross-sectional view showing a still further specific example of the actuator of the present invention, in which a magnetic field generator is not energized;

FIG. 22(*b*) shows the magnetic field generator, which is energized;

THE BEST MODE FOR CARRYING OUT THE INVENTION

The actuator of the present invention comprising a magnetic body and a magnetic field generator is driven by a magnetic force generated from the magnetic field generator. FIGS. 1 to 7 show examples of the actuator of the present invention comprising movable magnetic bodies and stationary magnetic field generators to describe the principles of the actuator.

Figure 1A:
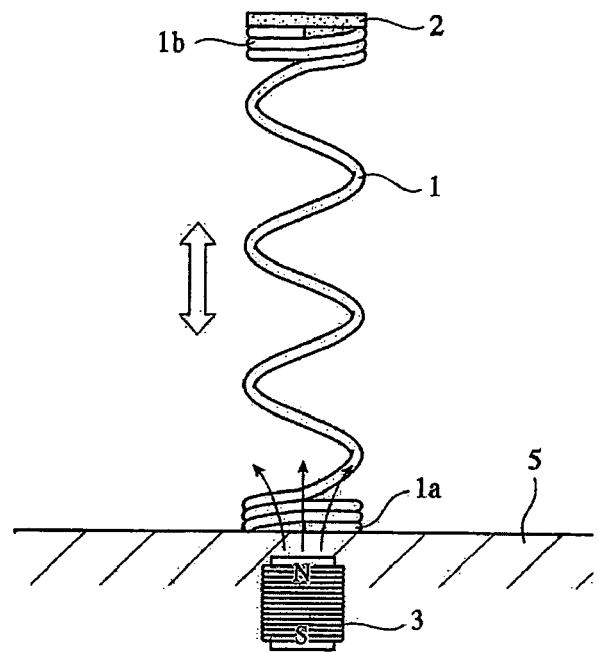
FIG. 1(a) is a schematic view showing an example of the principle of the actuator of the present invention, in which a magnetic body is attached to an upper end of a resilient shape memory member.
Figure 1B:
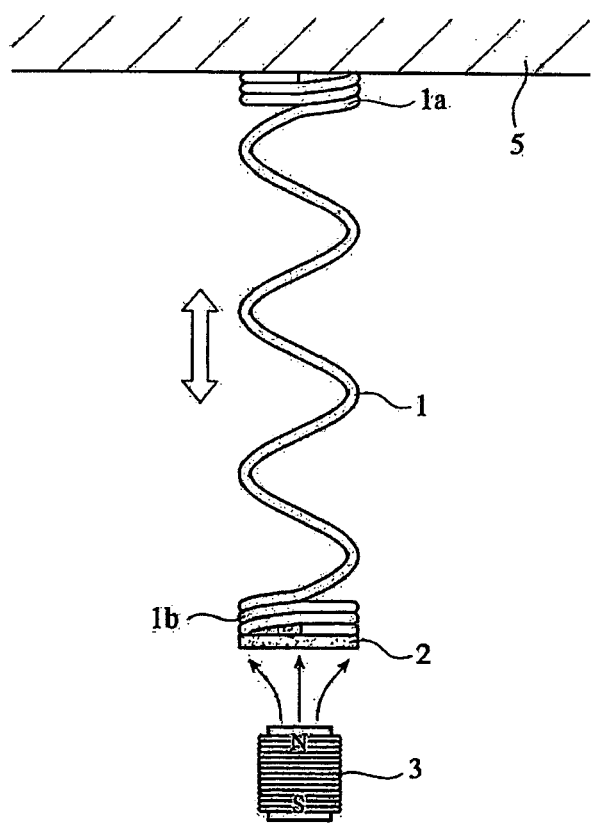
FIG. 1(b) is a schematic view showing another example of the principle of the actuator of the present invention, in which a magnetic body is attached to a lower end of a resilient shape memory member.

In the examples of FIGS. 1(*a*) and 1(*b*), one end 1*a* of a coil-spring-shaped, resilient shape memory member 1 is supported by a base 5, and a cylindrical soft magnetic body 2 is attached to the other end 1*b*. In the example of FIG. 1(*a*), the end 1*a* of the resilient shape memory member 1 is located at a lower position, and a magnetic field generator 3 is disposed below the end 1*a* along the axis of the resilient shape memory member 1. In the example of FIG. 1(*b*), the end 1*a* of the resilient shape memory member 1 is located at an upper position, and the magnetic field generator 3 is disposed blow the soft magnetic body 2 with a gap along the axis of the resilient shape memory member 1. In these examples, the direction of the magnetic pole of the magnetic field generator 3 is parallel to the expansion-contraction direction of the resilient shape memory member 1. The magnetic field generator 3 may be a common electromagnetic coil.

In FIG. 1(*a*), the resilient shape memory member 1 is a compression coil spring. The magnetic field generator 3 is energized to generate a magnetic field, whose magnetic force attracts the soft magnetic body 2 to compress the resilient shape memory member 1, so that the soft magnetic body 2 is moved downward. In FIG. 1(*b*), the resilient shape memory member 1 is a tension coil spring. The magnetic field generator 3 is energized to generate a magnetic field, whose magnetic force attracts the soft magnetic body 2 to expand the resilient shape memory member 1, so that the soft magnetic body 2 is moved downward. In these cases, when the magnetic field generators 3 are de-energized, the magnetic field disappears, causing the coil springs to return to the original position. Thus, the soft magnetic bodies 2 can move in the directions shown by the arrows by switching the energization of the magnetic field generators 3.

Figure 2A:
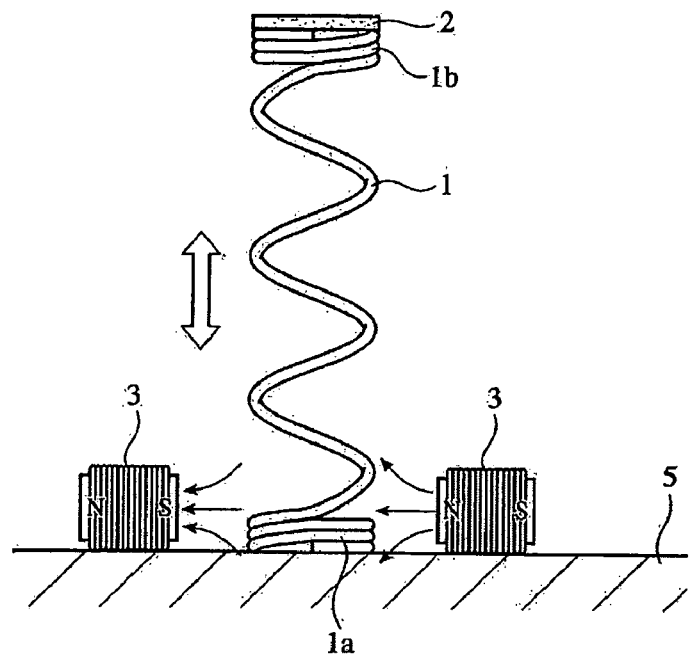
FIG. 2(a) is a schematic view showing a further example of the principle of the actuator of the present invention, in which a pair of magnetic field generators are disposed in the vicinity of a lower end of a resilient shape memory member.
Figure 2B:
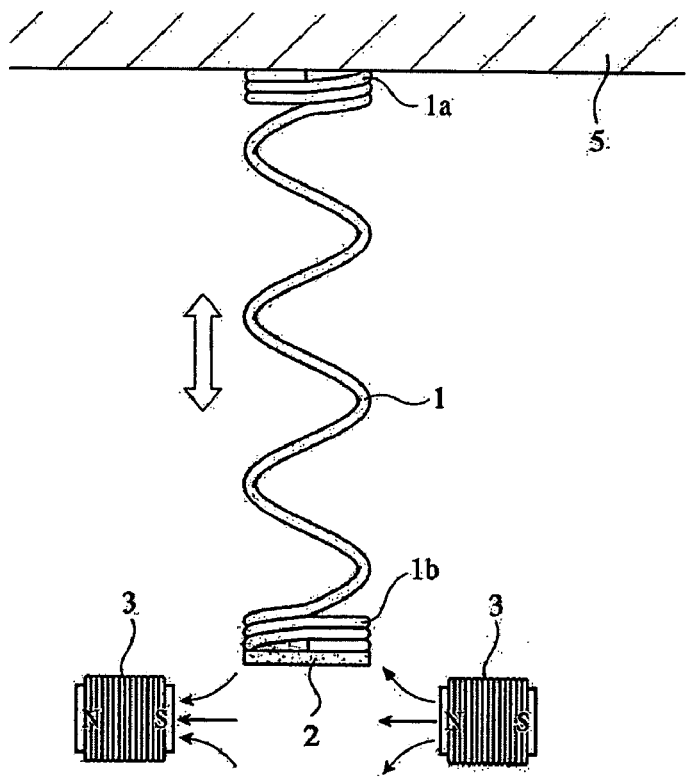
FIG. 2(b) is a schematic view showing a still further example of the principle of the actuator of the present invention, in which a pair of magnetic field generators are disposed in the vicinity of a magnetic body at a lower end of a resilient shape memory member.

The examples of FIGS. 2(*a*) and 2(*b*) are the same as those of FIGS. 1(*a*) and 1(*b*) except that a pair of magnetic field generators 3 are arranged perpendicularly to the expansion-contraction direction of the coil-spring-shaped, resilient shape memory member 1. The magnetic field generators 3 are energized such that the opposite magnetic poles face each other. Electromagnetic coils, etc. may be used as the magnetic field generators 3. In FIG. 2(*a*), the resilient shape memory member 1 is a compression coil spring. The magnetic field generators 3 are energized to generate a magnetic field, whose magnetic force attracts the soft magnetic body 2 to compress the resilient shape memory member 1, so that the actuator is driven. In FIG. 2(*b*), the resilient shape memory member 1 is a tension coil spring. The magnetic field generators 3 are energized to generate a magnetic field, whose magnetic force attracts the soft magnetic body 2 to expand the resilient shape memory member 1, so that the soft magnetic body 2 is moved downward. In these cases, when the magnetic field generators 3 are de-energized, the magnetic field disappears, causing the coil springs to return to the original position. Thus, the soft magnetic bodies 2 can move in the directions shown by the arrows by switching the energization of the magnetic field generators 3.

Figure 3:
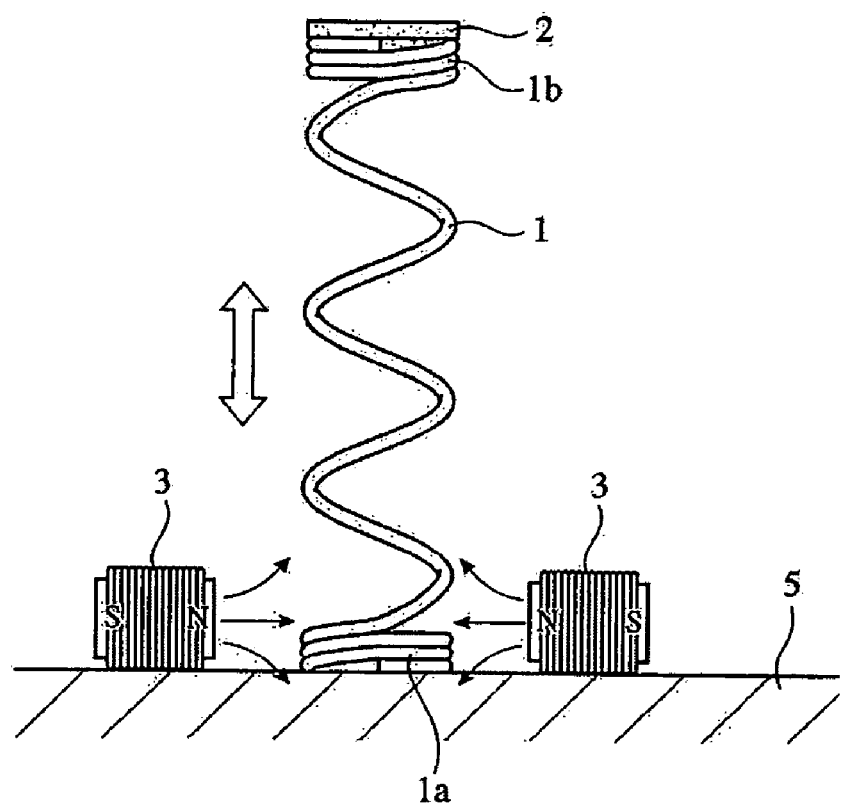
FIG. 3 is a schematic view showing a still further example of the principle of the actuator of the present invention, in which a pair of magnetic field generators have opposing magnetic poles with the same magnetic polarity.

The example of FIG. 3 is the same as that of FIG. 2(a), except that magnetic field generators 3 such as a pair of electromagnetic coils are energized such that the same magnetic pole faces each other.

Figure 4:
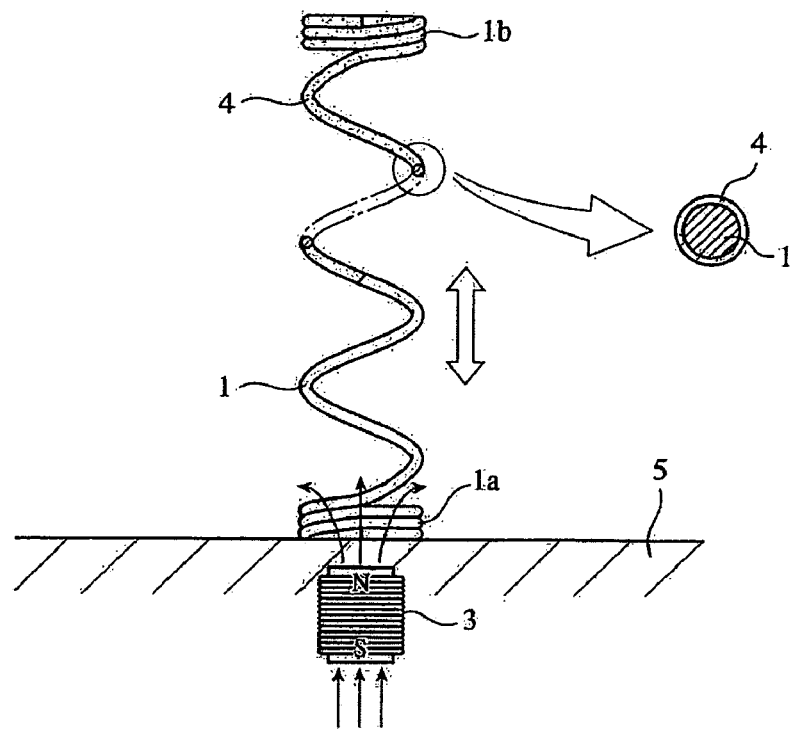
FIG. 4 is a schematic view showing a still further example of the principle of the actuator of the present invention, in which a resilient shape memory member is covered with a magnetic material.
Figure 5:
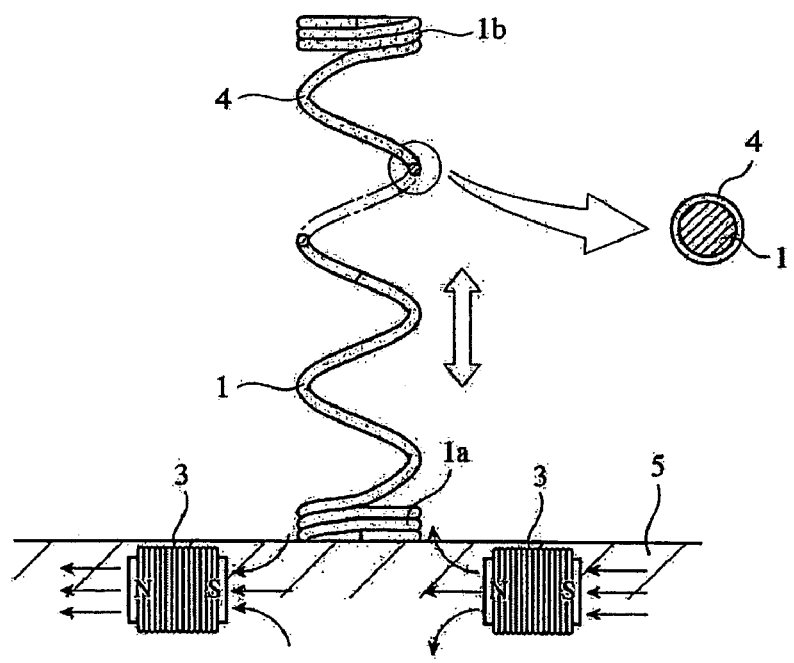
FIG. 5 is a schematic view showing a still further example of the principle of the actuator of the present invention, in which a pair of magnetic field generators are disposed in the vicinity of a lower end of a resilient shape memory member, and the resilient shape memory member is covered with a magnetic material.

The example of FIG. 4 is the same as that of FIG. 1(a), expect that a soft magnetic covering layer 4 is formed on the end portion 1b of the resilient shape memory member 1. The example of FIG. 5 is the same as that of FIG. 2(a), expect that a soft magnetic covering layer 4 is formed on the end portion 1b of the resilient shape memory member 1. In these examples, it is unnecessary to cover the entire resilient shape memory member 1 with a soft magnetic covering layer 4, and the soft magnetic covering layer 4 may cover only part of the resilient shape memory member 1.

Figure 6:
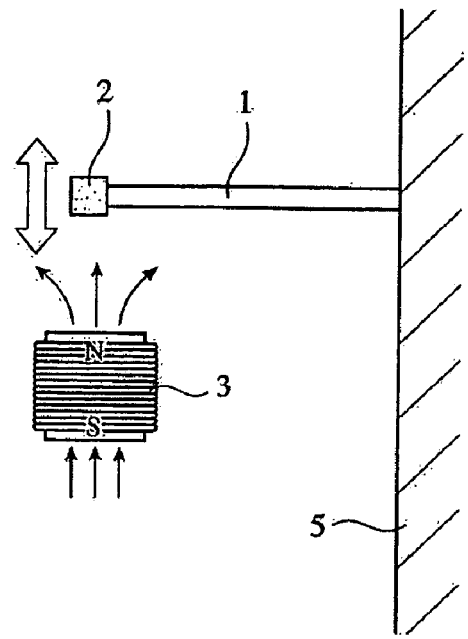
FIG. 6 is a schematic view showing a still further example of the principle of the actuator of the present invention, in which a resilient shape memory member is supported in a cantilever manner.
Figure 7:
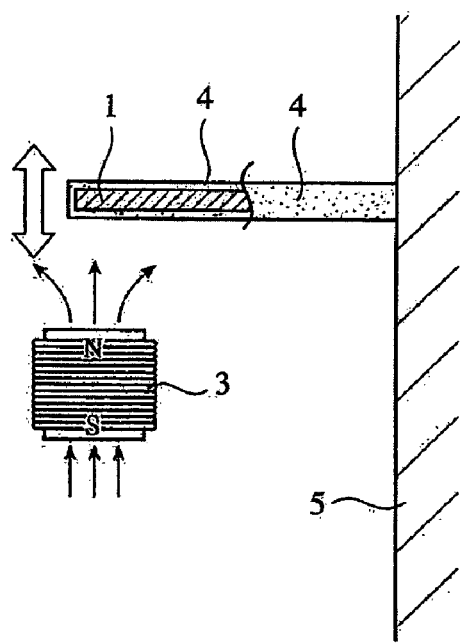
FIG. 7 is a schematic view showing a still further example of the principle of the actuator of the present invention, in which a resilient shape memory member supported in a cantilever manner is covered with a magnetic material.

In the example of FIG. 6, a plate-shaped, resilient shape memory member 1 is attached to a base 5 in a cantilever manner, with a soft magnetic body 2 attached to the end of the resilient shape memory member 1, and with a magnetic field generator 3 such as an electromagnetic coil disposed near the soft magnetic body 2 on either side of the displacement. The magnetic field generator 3 may be disposed on both sides of the resilient shape memory member 1. When the magnetic field generator 3 is energized to generate a magnetic field, the soft magnetic body 2 is attracted by a magnetic force and moved by bending the resilient shape memory member 1. The example of FIG. 7 is the same as that of FIG. 6, except that a soft magnetic covering layer 4 is formed on the plate-shaped, resilient shape memory member 1.

In the above examples, soft magnetic materials are used for the magnetic bodies. The soft magnetic bodies 2 per se generate no magnetic field, and they are in an absolutely undriven state when the magnetic field generators 3 do not produce a magnetic field. The positions of the soft magnetic bodies 2 are not restrictive. The soft magnetic bodies 2 may be attached to the ends of the resilient shape memory members 1 as shown in FIGS. 1 to 3, and at least part of the resilient shape memory members 1 may be covered with the soft magnetic materials as shown in FIGS. 4 and 5. In these cases, the soft magnetic materials are preferably pure iron, and soft magnetic alloys such as silicon steel, Fe—Ni alloys, or Fe—Co alloys, particularly preferably Fe—Co alloys.

FIGS. 8 to 10 are schematic views showing the actuator of the present invention. The actuator shown in FIG. 8 comprises a pair of coil-spring-shaped, resilient shape memory members 1, 1, a magnetic field generator 3 such as an electromagnetic coil fixed to the ends of the resilient shape memory members 1, 1, a pair of stationary members 9, 9 for fixing the outer ends of the resilient shape memory members 1, 1, permanent magnets 7, 7 attached to the stationary members 9, 9, and a cylindrical frame 8 covering the resilient shape memory members 1, 1, the magnetic field generator 3, and the permanent magnets 7, 7. The magnetic field generator 3 is attached to a ring 10 for fixing the ends of the coil-spring-shaped, resilient shape memory members 1, 1, and the ring 10 is movable in the cylindrical frame 8, so that the magnetic field generator 3 acts as the movable member of the actuator. Each permanent magnet 7, 7 is fixed to each stationary member 9, such that magnetic poles with the same polarity are facing each other. The frame 8 and the ring 10 are preferably made of nonmagnetic materials such as Al alloys and resins.

The coil springs used as the resilient shape memory members 1 may be (a) a combination of a compression coil spring and a tension coil spring, (b) compression coil springs, or (c) tension coil springs. To increase the stroke, the magnetic field generator 3 is initially positioned near one permanent magnet 7. The coil springs are thus preferably a combination of a compression coil spring and a tension coil spring.

Figure 8A:
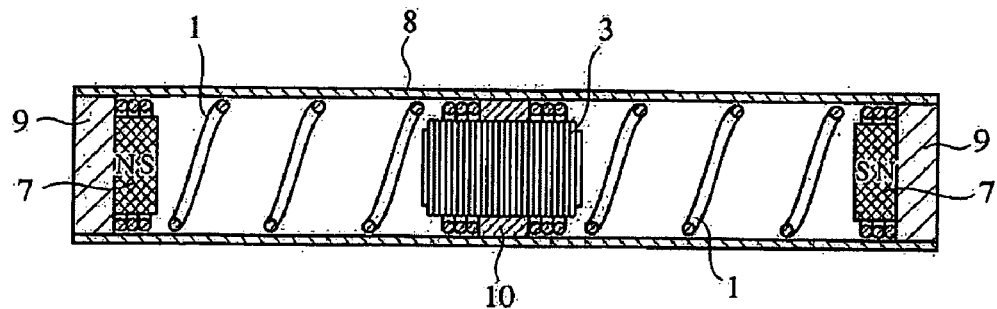
FIG. 8(a) is a schematic cross-sectional view showing an example of the actuator of the present invention, in which a magnetic field generator is not energized.
Figure 8B:
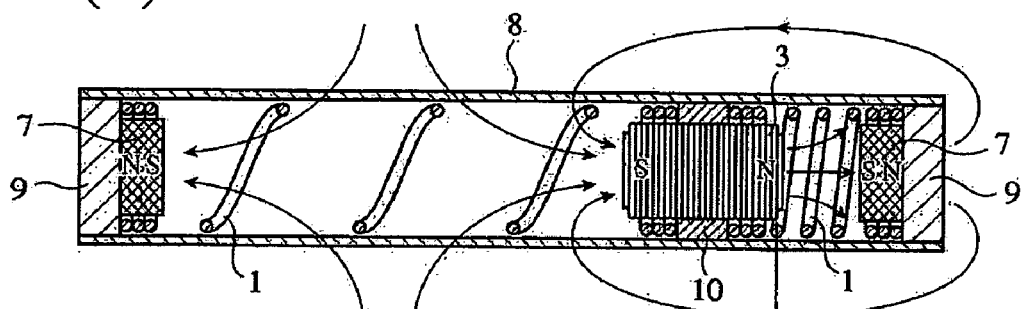
FIG. 8(*b*) shows the magnetic field generator energized to move in one direction.
Figure 8C:
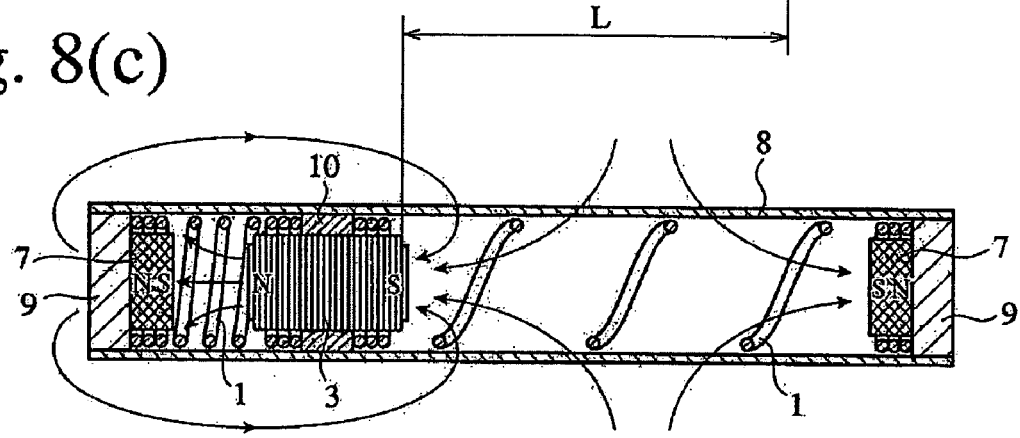

In the example of FIG. 8, the resilient shape memory members 1, 1 are compression springs, though not restrictive. The permanent magnets 7, 7 have south poles inside. As shown in FIG. 8(a), when the magnetic field generator 3 is not energized, there is no attractive/repulsive force between the permanent magnets 7, 7 and the movable magnetic field generator 3, so that a balanced resilient force of the resilient shape memory members 1, 1 positions the magnetic field generator 3 approximately in the middle between the permanent magnets 7, 7. As shown in FIG. 8(b), when the magnetic field generator 3 is energized to generate a magnetic field with a north pole on the right, the magnetic field generator 3 is moved to the right permanent magnet 7 by attraction thereto and repulsion from the left permanent magnet 7. Though an expanded resilient shape memory member 1 may be under tensile stress at the maximum displacement of the magnetic field generator 3, both resilient shape memory members 1, 1 are preferably in a compressed state to prevent them from separating from the magnetic field generator 3 when no external stress is applied to them in contact with the magnetic field generator 3. Further, as shown in FIG. 8(c), when the magnetic field generator 3 is energized in a reverse direction, the magnetic field generator 3 is displaced in the reverse direction. When the magnetic field generator 3 is de-energized, it returns to the original position shown in FIG. 8(a). In the drawings, L represents the displacement (stroke) of the movable magnetic field generator 3.

Figure 9A:
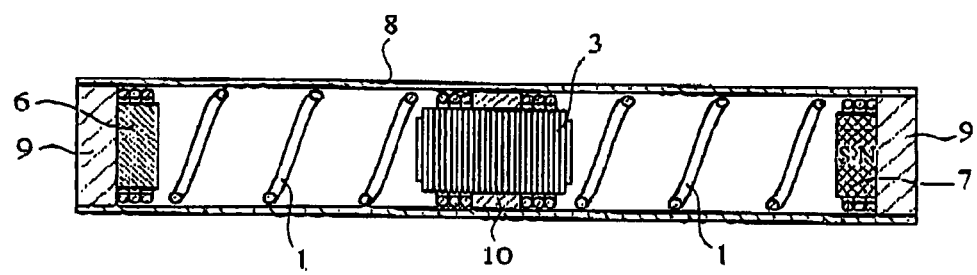
FIG. 9(*a*) is a schematic cross-sectional view showing another example of the actuator of the present invention, in which a magnetic field generator is not energized.
Figure 9B:
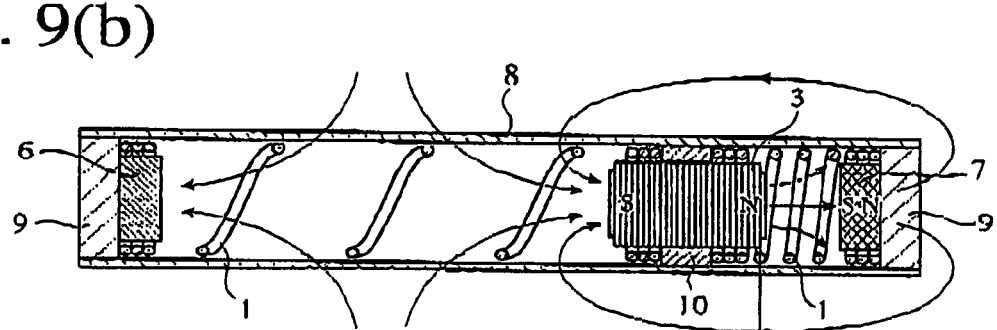
Figure 9C:
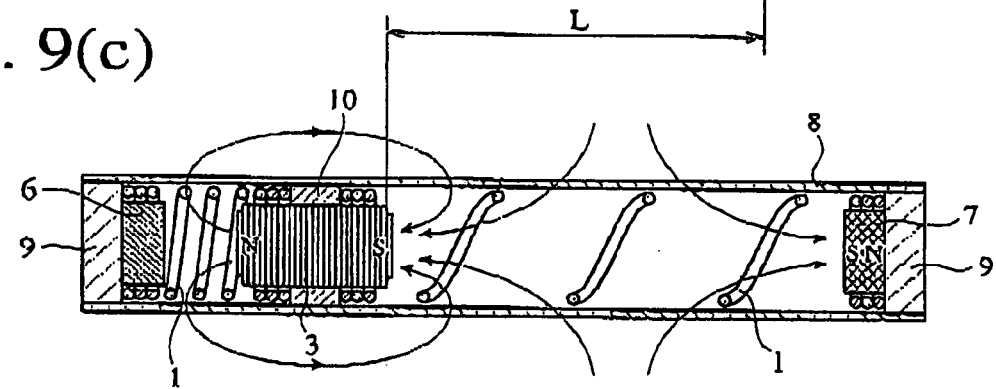

The example of FIG. 9 is the same as that of FIG. 8, except that a permanent magnet 7 is attached to one stationary member 9, and that a nonmagnetic body 6 is attached to the other stationary member 9. The permanent magnet 7 has a south pole inside. As shown in FIG. 9(a), when the magnetic field generator 3 is not energized, there is no attractive/repulsive force between the permanent magnet 7, 7 and the movable magnetic field generator 3, so that the magnetic field generator 3 is positioned approximately in the middle between the nonmagnetic body 6 and the permanent magnet 7 by a balanced resilient force of the resilient shape memory members 1, 1. As shown in FIG. 9(b), when the magnetic field generator 3 is energized to generate a magnetic field with a north pole on the right, the magnetic field generator 3 is moved toward the permanent magnet 7 by attraction. Further, as shown in FIG. 9(c), when the magnetic field generator 3 is energized in a reverse direction to generate a magnetic field with a south pole on the right, the magnetic field generator 3 is repelled by the permanent magnet 7. When the magnetic field generator 3 is de-energized, it returns to the original position shown in FIG. 9(a).

Figure 10A:
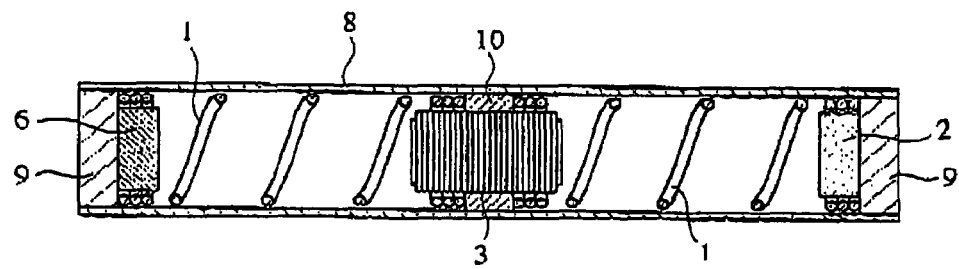
FIG. 10(*a*) is a schematic cross-sectional view showing a further example of the actuator of the present invention, in which a magnetic field generator is not energized.
Figure 10B:
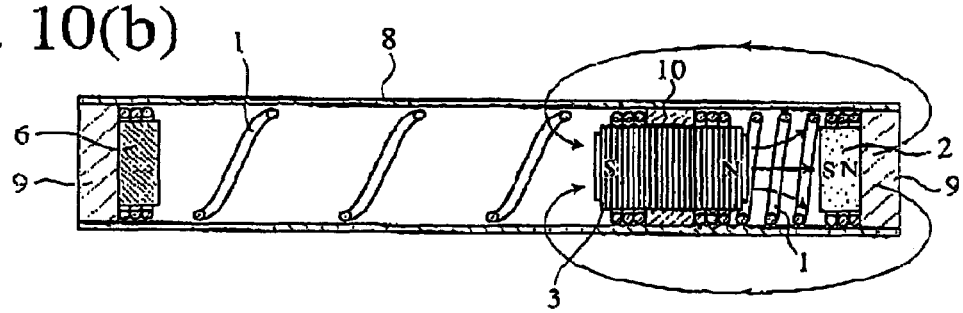

The example of FIG. 10 is the same as that of FIG. 8, except that a soft magnetic body 2 is attached to one stationary member 9, and that a nonmagnetic body 6 is attached to the other stationary member 9. As shown in FIG. 10(a), when the magnetic field generator 3 is not energized, no attractive/repulsive force is applied to the movable magnetic field generator 3, so that the magnetic field generator 3 is positioned approximately in the middle between the soft magnetic body 2 and the nonmagnetic body 6 by a balanced resilient force of the resilient shape memory members 1, 1. When the magnetic field generator 3 is energized to generate a magnetic field, the magnetic field generator 3 is moved to the soft magnetic body 2 by attraction (FIG. 10(b)).

FIG. 11 is a schematic view showing a still further example of the actuator of the present invention. The actuator comprises a coil-spring-shaped, resilient shape memory member 1, a ring 10 fixed to an end of the resilient shape memory member 1, a permanent magnet 7 fixed to the ring 10, a stationary member 9 for fixing the outer end of the resilient shape memory member 1, a magnetic field generator 3 such as an electromagnetic coil attached to the stationary member 9, and a cylindrical frame 8 covering the resilient shape memory member 1, the magnetic field generator 3, and the permanent magnet 7. Though this actuator may have a soft magnetic body instead of the permanent magnet 7, explanation will be focused below on the case of using the permanent magnet 7. The permanent magnet 7 is attached to the ring 10 for fixing the end of the resilient shape memory member, and the ring 10 is movable in the cylindrical frame 8, so that the permanent magnet 7 acts as the movable member of the actuator. The frame 8 and the ring 10 are preferably made of nonmagnetic materials such as Al alloys and resins.

Figure 11A:
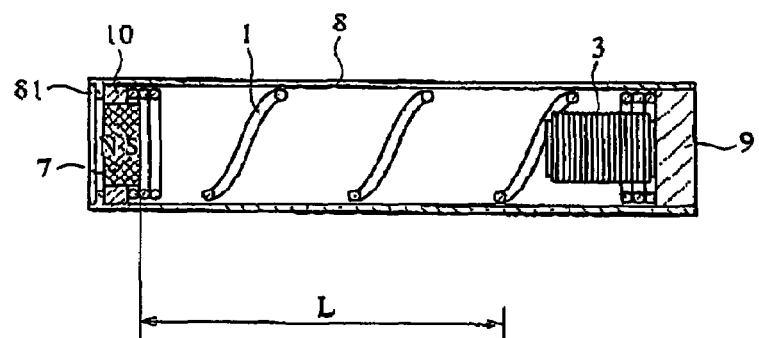
FIG. 11(*a*) is a schematic cross-sectional view showing a still further example of the actuator of the present invention, in which a permanent magnet is not moved.
Figure 11B:
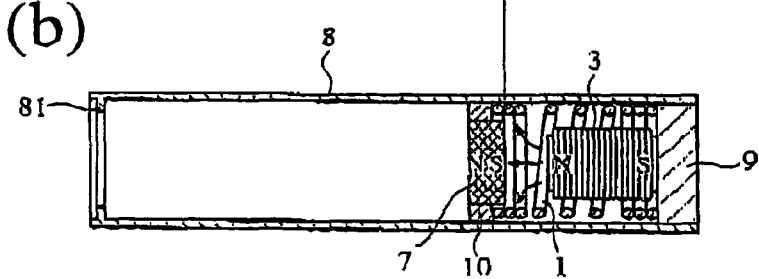

In the example of FIG. 11, the resilient shape memory member 1 is a compression spring, though not restrictive. The permanent magnet 7 has south poles facing the magnetic field generator. As shown in FIG. 11(a), when the magnetic field generator 3 is not energized, no attractive/repulsive force is applied therefrom to the movable permanent magnet 7, so that the ring 10 fixing the permanent magnet 7 remains in contact with a stopper 81 of the cylindrical frame 8 with the resilient shape memory member 1 compressed only slightly. As shown in FIG. 11(b), when the magnetic field generator 3 is energized to generate a magnetic field with a north pole on the left, the permanent magnet 7 is moved to the magnetic field generator 3 by attraction. When the magnetic field generator 3 is de-energized, the permanent magnet 7 returns to the original position shown in FIG. 11(a). In the drawings, L represents the displacement (stroke) of the movable permanent magnet 7. When the permanent magnet 7 is at the initial position shown in FIG. 11(a), no load may be applied to the resilient shape memory member 1. In a case where no external force is applied to the resilient shape memory member 1 in contact with the permanent magnet 7, the resilient shape memory member 1 is preferably in a compressed state to prevent separation from the ring 10 of the movable member.

FIGS. 12 are cross-sectional views showing a specific example of the actuator of the present invention. The actuator comprises a pair of coil-spring-shaped, resilient shape memory members 101, 102, a movable member 30 comprising a magnetic field generator 3 such as an electromagnetic coil fixed to ends of the resilient shape memory members, a pair of ring-shaped permanent magnets 13a, 13b fixed to the outer ends of the resilient shape memory members 101, 102, a shaft 11 fixed to the movable member 30, and a cylindrical frame 8 covering them.

Figure 13:
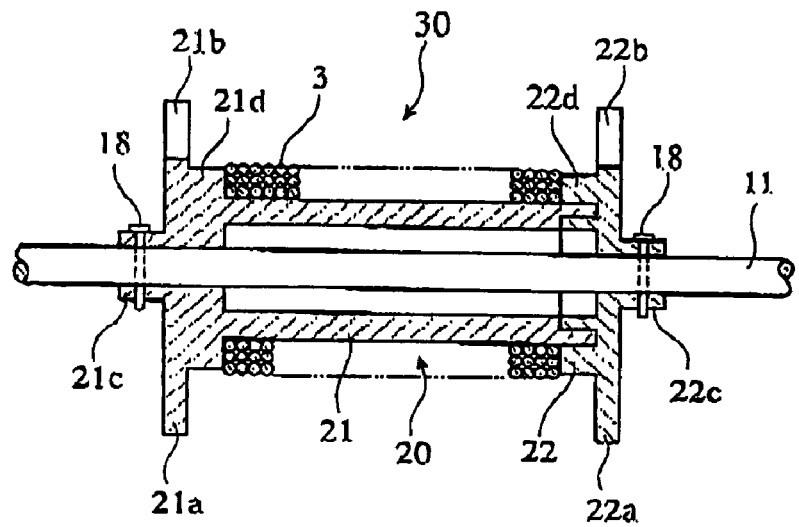
FIG. 13 is an enlarged cross-sectional view showing a movable member in the actuator of the present invention.

As shown in FIG. 13, the movable member 30 comprises an electromagnetic coil 3 as a magnetic field generator, and a bobbin 20 for supporting the electromagnetic coil 3. The bobbin 20 made of a nonmagnetic material such as a plastic comprises a body 21 having a flange 21a and a bobbin attachment 22 having a flange 22a.

Figure 12A:
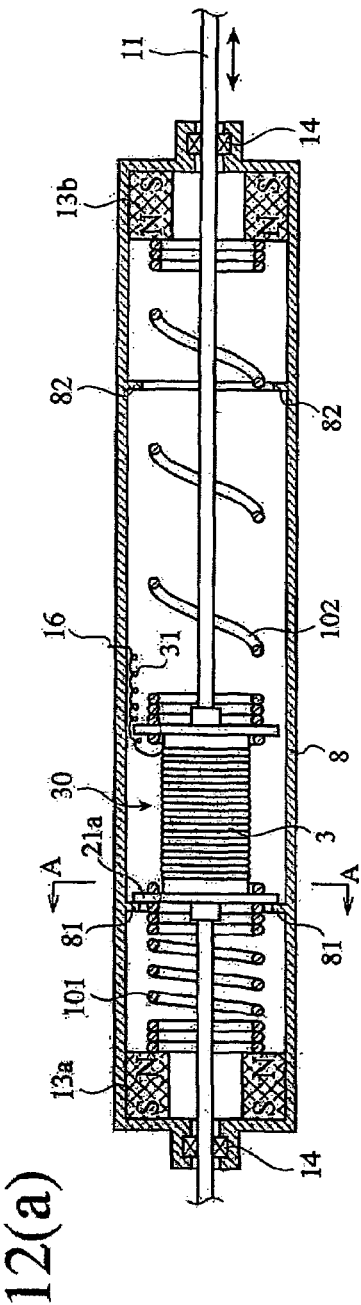
FIG. 12(*a*) is a cross-sectional view showing a specific example of the actuator of the present invention, in which a non-energized magnetic field generator engages one stopper.
Figure 14:
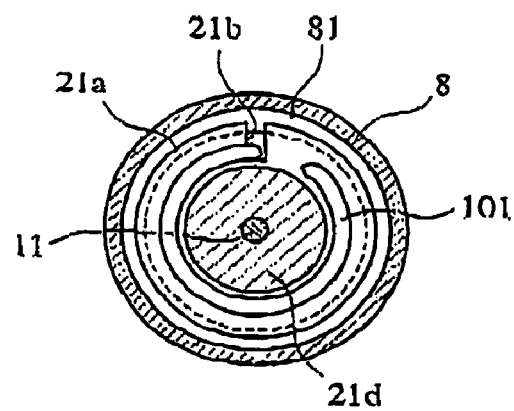
FIG. 14 is a cross-sectional view taken along the line A-A in FIG. 12(*a*)
Figure 15:
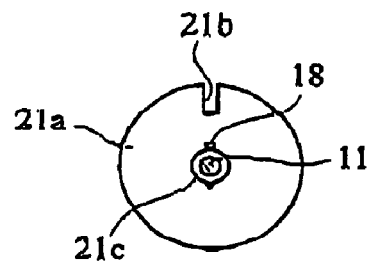
FIG. 15 is a side view showing a bobbin of the movable member, which is viewed from one flange.

FIG. 14 is an enlarged cross-sectional view taken along the line A-A in FIG. 12(a), and FIG. 15 is a view showing the bobbin 20 from the side of the flange 21a. As shown in FIGS. 13 to 15, the flanges 21a, 22a respectively have grooves 21b, 22b for fixing the resilient shape memory members 101, 102. The inner end portion of the resilient shape memory member 101 passing through the groove 21b is wound on a large-diameter portion 21d of the body 21, and fitted into a hole (not shown) formed therein. The inner end portion of the resilient shape memory member 102 passing through the groove 22b is wound on a large-diameter portion 22d of the attachment 22, and fitted into a hole (not shown) formed therein, in the same manner. The resilient shape memory members 101, 102 are thus fixed to the bobbin 20. The outer diameters of the flanges 21a, 22a are slightly smaller than the inner diameter of the cylindrical frame 8 and larger than the inner diameters of stoppers 81, 82.

The body 21 and the attachment 22 have annular projections 21c, 22c, respectively. The shaft 11 passes through the bobbin 20 comprising the body 21 and the attachment 22, and is fixed to the annular projections 21c, 22c by fasteners 18, 18 such as screws. The shaft 11 passes inside the resilient shape memory members 101, 102 through the bores of the ring-shaped permanent magnets 13a, 13b, and is movably supported by bearings 14, 14 fixed to the cylindrical frame 8. The movement of the magnetic field generator 3 in the axial direction of the resilient shape memory members 101, 102 causes the shaft 11 to move. Thus, an end of the shaft 11 can act as a driving member.

Figure 16:
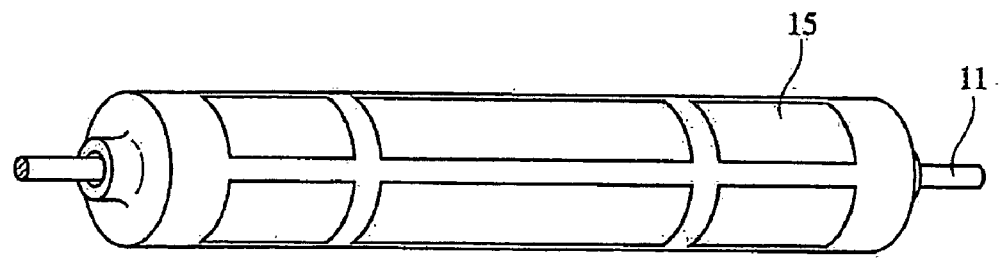
FIG. 16 is a perspective view showing an example of the appearance of the actuator of the present invention.

The permanent magnets 13a, 13b are fixed to the cylindrical frame 8 such that magnetic poles with the same polarity are facing each other. The cylindrical frame 8 is preferably made of a nonmagnetic body such as an Al alloy and a resin. The stoppers 81, 82 for regulating the stop positions of the movable member 30 are formed on the inner surface of the cylindrical frame 8. Though the stoppers 81, 82 may have any shapes, they are preferably annular flanges in view of durability as shown in FIG. 14. The cylindrical frame 8 has an outlet 16 for a lead wire 31 of the magnetic field generator 3. As shown in FIG. 16, the cylindrical frame 8 may have windows 15 to prevent the accumulation of heat generated from the magnetic field generator 3.

At the initial position as shown in FIG. 12(a), at which the flange 21a is in contact with the stopper 81 with no magnetic fields applied, the resilient shape memory member 101 is preferably a tension coil spring, and the resilient shape memory member 102 is preferably a compression coil spring.

Figure 12B:
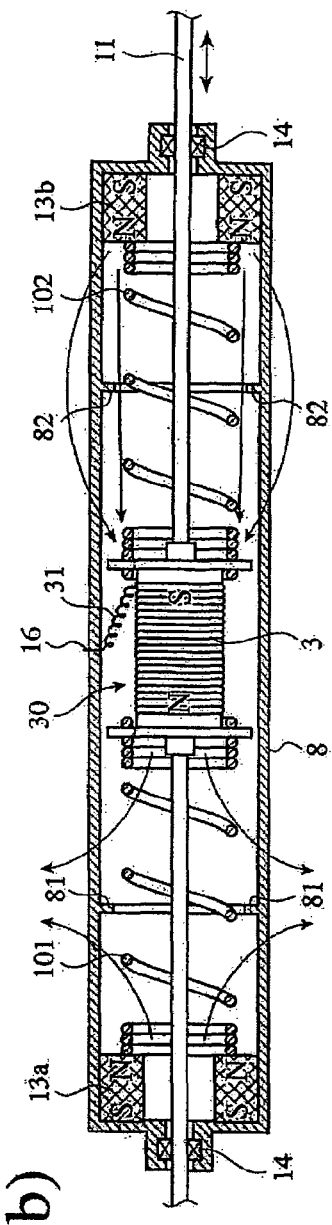
Figure 12C:
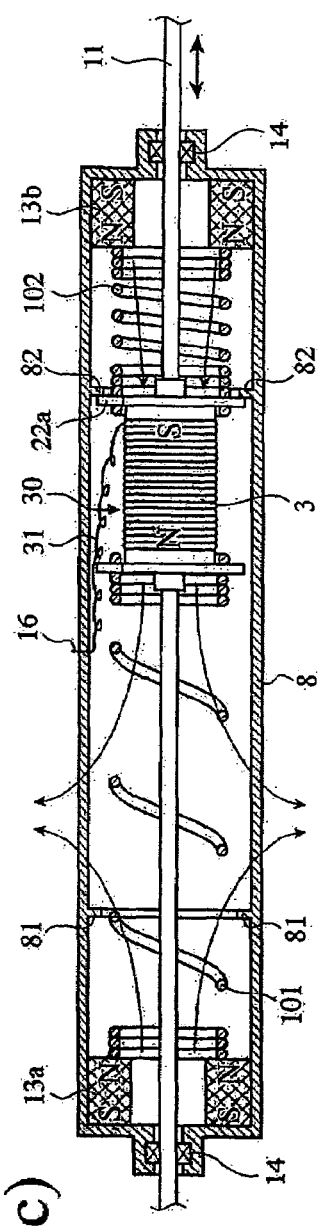

When the magnetic field generator 3 shown in FIG. 12(a) is energized to generate a magnetic field with a south pole on the right, the magnetic field generator 3 is attracted to the permanent magnet 13b and repelled by the permanent magnet 13a, whereby the movable member 30 is moved to the right as shown in FIG. 12(b). Thus, the resilient shape memory member 101 is expanded, while the resilient shape memory member 102 is compressed. When the movable member 30 shown in FIG. 12(b) is further moved to the right, the flange 22a of the bobbin 20 comes into contact with the stopper 82 to stop the movable member 30 as shown in FIG. 12(c). When the magnetic field generator 3 is de-energized, the movable member 30 is returned to the stop position shown in FIG. 12(a) by the action of the resilient shape memory members 101, 102.

Figure 17:
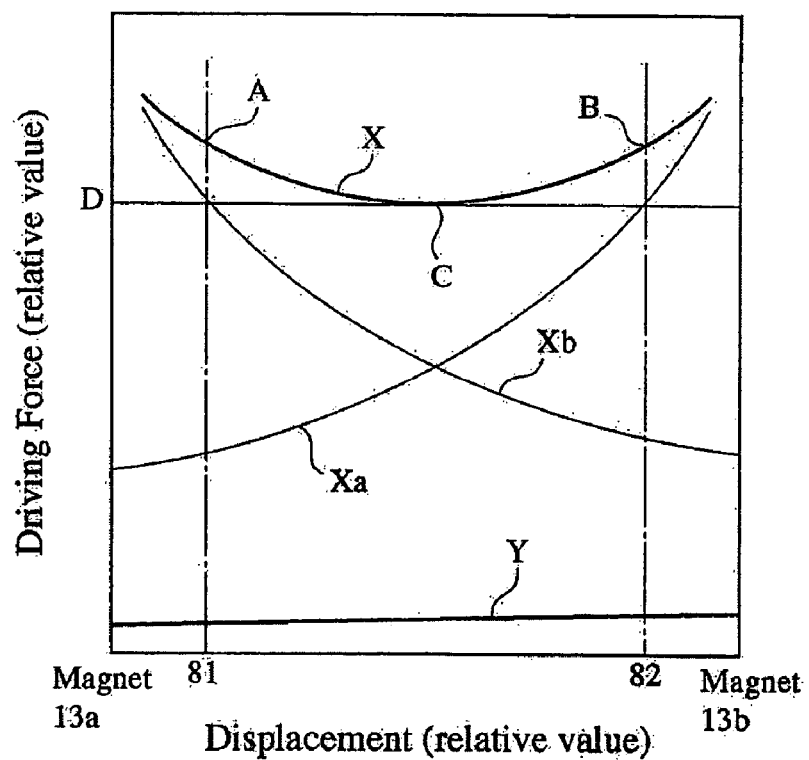
FIG. 17 is a graph showing a driving force applied to the movable member.

FIG. 17 schematically shows the driving force applied to the movable member 30 of the actuator of FIG. 12. In this graph, the left end corresponds to the surface of the permanent magnet 13a, the right end corresponds to the surface of the permanent magnet 13b, and 81 and 82 represent the positions of the stoppers 81, 82, respectively.

A curve Xa represents the attractive/repulsive force generated by the permanent magnet 13b, and a curve Xb represents the attractive/repulsive force generated by the permanent magnet 13a. A curve X represents combined magnetic forces applied to the movable member 30 (total attractive/repulsive force of the curve Xa and the curve Xb). Because the attractive/repulsive force provided by each permanent magnet 13a, 13b is inversely proportional to the square of the distance from the magnet, the curves Xa, Xb drastically decrease as separated from the permanent magnets 13a, 13b, respectively. For example, when the movable member 30 receives an attractive force from the permanent magnet 13a, it is also under a repulsive force from the permanent magnet 13b. Thus, the movable member 30 constantly receives the combined magnetic force from the permanent magnets 13a, 13b. The combined magnetic force shown by the curve X is larger near the permanent magnets 13a, 13b and smaller in the center, with remarkably smaller change as compared with the case of using single permanent magnet. As a result, the curve X is relatively not steep. D represents the maximum load applicable to the movable member 30. When a load actually applied to the movable member 30 is less than D, the movable member 30 can move.

The line Y represents a combined resilient force of the resilient shape memory members 101 and 102. The combined resilient force is much smaller than the combined magnetic force because the resilient shape memory members 101, 102 are superelastic. Thus, the resilient forces of the resilient shape memory members 101, 102 are negligibly small as resistance to the displacement of the movable member 30.

With the resilient forces of the resilient shape memory members 101, 102 not taken into consideration, the total magnetic force is the largest at the positions of the stoppers 81, 82 (at points A and B) in the stroke limited by the stoppers 81, 82. As the movable member 30 is moving from the position of each stopper 81, 82 to the center, the total magnetic force applied to the movable member 30 decreases to the smallest at the point C, with small change in the magnetic force.

FIG. 18 is a cross-sectional view showing another specific example of the actuator of the present invention. The actuator comprises a pair of coil-spring-shaped, resilient shape memory members 101, 102, a movable member 30 comprising a ring-shaped permanent magnet 13 and fixed to ends of the resilient shape memory members, a pair of magnetic field generators 3a, 3b such as electromagnetic coils disposed outside the outer ends of the resilient shape memory members 101, 102, a shaft 11 fixed to the movable member 30, and a cylindrical frame 8 covering the resilient shape memory members 101, 102 and the ring-shaped permanent magnet 13.

Figure 19A:
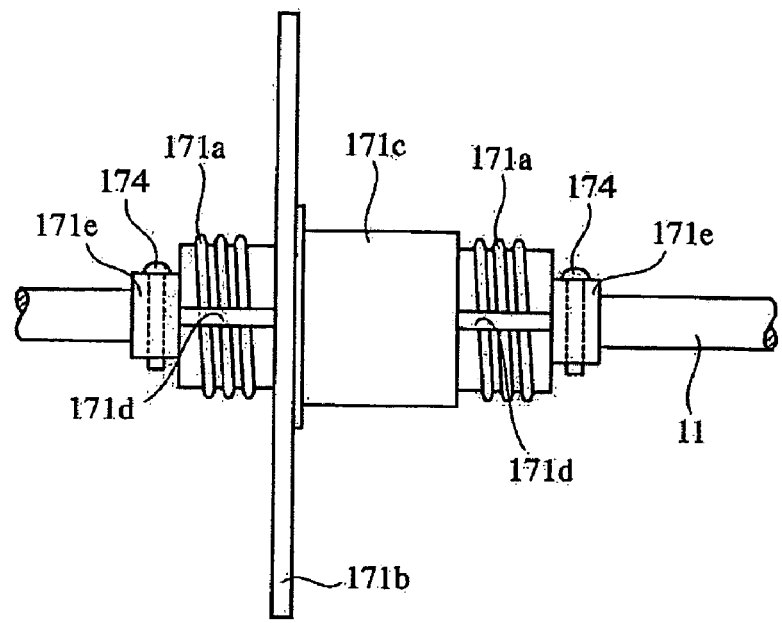
FIG. 19(*a*) is an enlarged side view showing a body of a magnet-supporting member in the movable member.

As shown in FIG. 19, the movable member 30 comprises the permanent magnet 13 and a support member 17 for fixing the permanent magnet 13. FIG. 19(a) is a side view showing the details of the magnet support member 17. The support member 17 made of a nonmagnetic material such as a plastic comprises a large-diameter portion 171c for supporting the permanent magnet 13, a flange 171b disposed on an end of the large-diameter portion 171c, and external thread portions 171a, 171a onto which a pair of cylindrical nuts 172, 173 are screwed. The outer diameters of the external thread portions 171a, 171a are slightly smaller than the outer diameter of the large-diameter portion 171c. The external thread portions 171a, 171a have grooves 171d, 171d into which the end portions of the resilient shape memory members 101, 102 are inserted. The depths of the grooves 171d, 171d are preferably such that the end portions of the inserted resilient shape memory members 101, 102 slightly protrude from the grooves of the external thread portions 171a, 171a. Ring-shaped projections 171e, 171e are integrally formed outside the external thread portions 171a, 171a. The support member 17 having such a structure is preferably an integrally molded plastic member.

The inner diameter of the body 171 of the support member is equal to the outer diameter of the shaft 11, and the body 171 is fixed to the shaft 11 by fixing screw members 174, 174, which is inserted into screw holes of the ring-shaped projections 171e, 171e and the shaft 11.

Figure 19B:
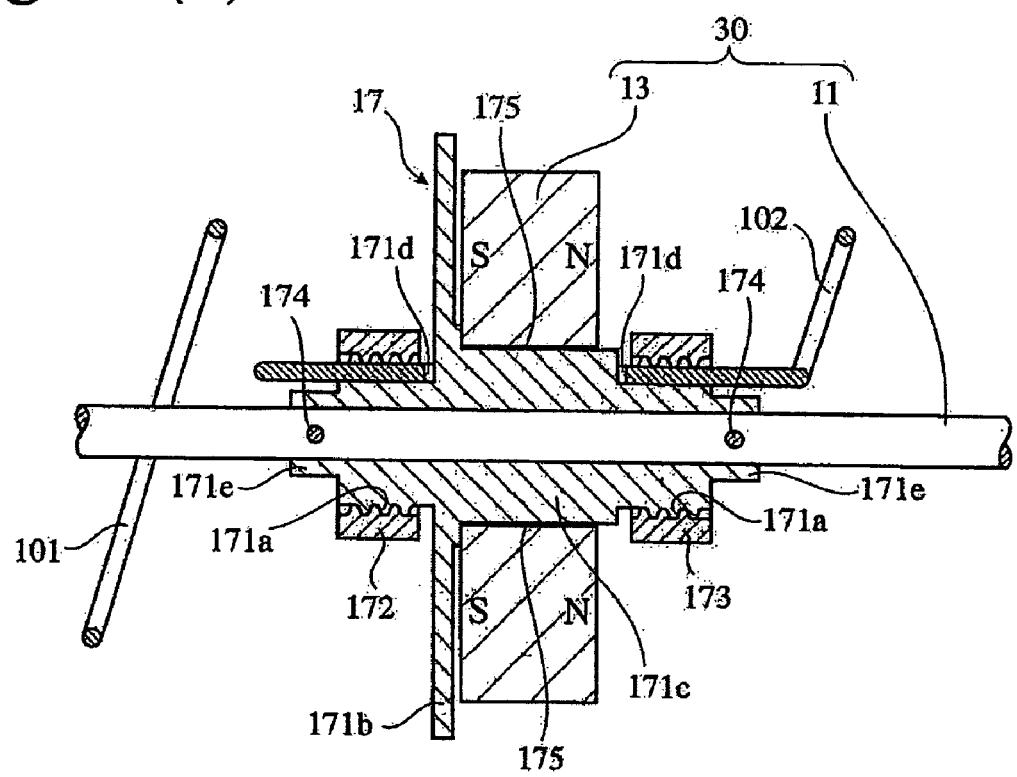

As shown in FIG. 19(b), the inner diameter of the permanent magnet 13 is slightly larger than the outer diameter of the large-diameter portion 171c of the body 171, and the outer diameter of the large-diameter portion 171c is slightly larger than the outer diameters of the external thread portions 171a. It is preferred that the permanent magnet 13 is attached to the large-diameter portion 171c from the side opposite to the flange 171b, and the permanent magnet 13 is fixed by an adhesive 175 with its side surface in contact with the flange 171b. Thus, the permanent magnet 13 can be precisely positioned.

The nut 172 is screwed onto the external thread portion 171a with the end portion of the resilient shape memory member 101 inserted into one groove 171d, and the nut 173 is screwed onto the external thread portion 171a with the end portion of the resilient shape memory member 102 inserted into the other groove 171d. The end portions of the inserted resilient shape memory members 101, 102 slightly protrude from the grooves 171d, 171d of the external thread portions 171a, 171a, thereby being firmly fixed by screw threads of the screwed nuts 172, 173. The external thread portions 171a, 171a and the nuts 172, 173 are preferably complementarily tapered to surely fix the end portions of the resilient shape memory members.

Figure 18A:
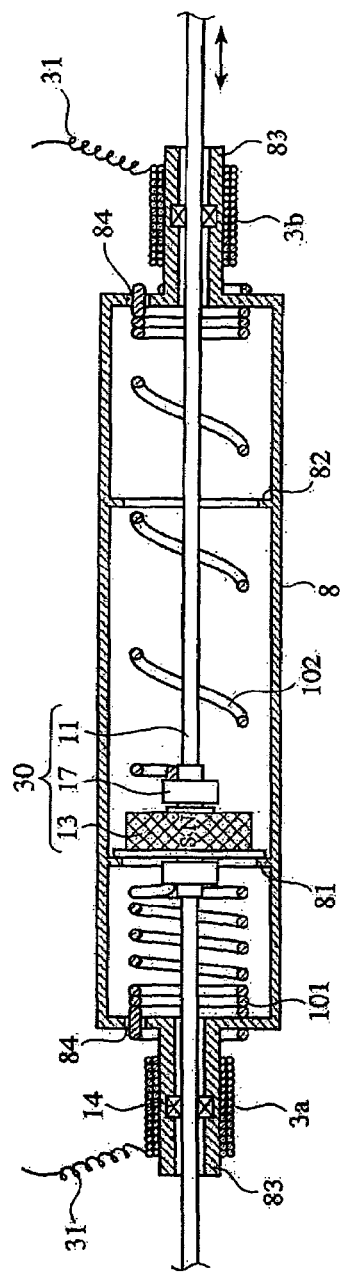
FIG. 18(*a*) is a cross-sectional view showing another specific example of the actuator of the present invention, in which a non-energized permanent magnet causes a flange of a movable member to engage one stopper.

As shown in FIG. 18(a), the cylindrical frame 8 has cylindrical projections 83, 83 at both ends. The shaft 11 extending inside the resilient shape memory members 101, 102 is movably supported by bearings 14, 14 provided in the cylindrical projections 83, 83 of the cylindrical frame 8. The magnetic field generators of the electromagnetic coils 3a, 3b are wound on the cylindrical projection 83, 83. The outer end portions of the resilient shape memory members 101, 102 may be wound on the cylindrical projections 83, 83 through outlets 84, 84 formed in the cylindrical frame 8 respectively. The location of the magnetic field generators 3a, 3b outside the cylindrical frame 8 prevents heat accumulation.

The stoppers 81, 82 for regulating the stop positions of the movable member 30 may be formed on the inner surface of the cylindrical frame 8. Though whichever having a larger outer diameter between the flange 171b and the permanent magnet 13 may come into contact with the stoppers 81, 82, the flange 171b preferably comes into contact with the stoppers to prevent the permanent magnet 13 from receiving impact by direct contact. Further, only an inside portion of the flange 171b is preferably in contact with the permanent magnet 13 with its outside portion slightly separated from the permanent magnet 13, to substantially avoid the permanent magnet 13 from receiving impact. Though the stoppers 81, 82 may have any shapes, they are preferably annular flanges for durability. The outer diameters of the flange 171b and the permanent magnet 13 are larger than the inner diameter of the cylindrical frame 8, and at least one of the outer diameters of the flange 171b and the permanent magnet 13 is larger than the inner diameters of the stoppers 81, 82.

At the initial position as shown in FIG. 18(a), at which the left surface of the flange 171b is in contact with the stopper 81 with no magnetic fields applied, the resilient shape memory member 101 is preferably a tension coil spring, and the resilient shape memory member 102 is preferably a compression coil spring.

Figure 18B:
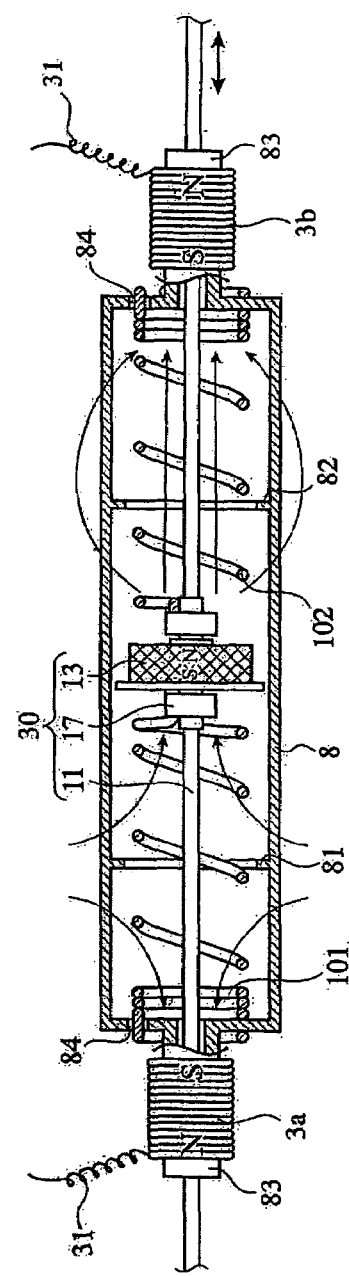
Figure 18C:
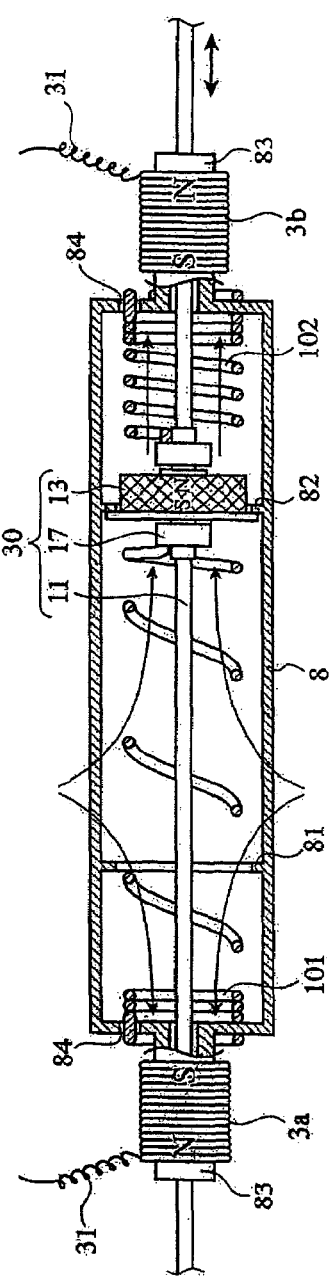

When the magnetic field generators 3a, 3b are energized with south poles inside in a state shown in FIG. 18(a), the permanent magnet 13 is attracted to the magnetic field generator 3b and repelled by the magnetic field generator 3a, whereby the movable member 30 is moved to the right as shown in FIG. 18(b). Thus, the resilient shape memory member 101 is expanded, while the resilient shape memory member 102 is compressed. When the movable member 30 shown in FIG. 18(b) is further moved to the right, the right surface of the flange 171b comes into contact with the stopper 82 to stop the movable member 30 as shown in FIG. 18(c). When the magnetic field generators 3a, 3b are de-energized, the movable member 30 is returned to the stop position shown in FIG. 18(a) by the action of the resilient shape memory members 101, 102.

FIG. 20 is a cross-sectional view showing a further specific example of the actuator of the present invention. The actuator comprises a coil-spring-shaped, resilient shape memory member 1, a pair of magnetic field generators 3a, 3b such as electromagnetic coils each fixed to each end 1a, 1b of the resilient shape memory member 1, a stationary shaft 110 supporting a ring-shaped permanent magnet 13, one or more output rods 19, 19 fixed to the magnetic field generators 3a, 3b, and a cylindrical frame 8 covering them.

Because the magnetic field generators 3a, 3b are approximately the same as those of FIG. 13, explanation will be focused on the differences. Outer flanges 21a, 21a of bobbins 20, 20, on which the magnetic field generators of the electromagnetic coils 3a, 3b are wound, have internal thread portions 21e, 21e, and external thread portions 19a of the output rods 19, 19 are screwed thereinto. The output rods 19, 19 are supported movably by bearings 14, 14 on annular projections of the cylindrical frame 8. The magnetic field generators 3a, 3b are movably supported by the stationary shaft 110 extending thorough the bobbins 20, 20. One or more output rods 19, 19 may be fixed to each magnetic field generator 3a, 3b. Three or more output rods 19, 19 are preferably connected to each magnetic field generator for stability. The output rods 19, 19 are preferably made of nonmagnetic materials such as resins and Al.

Because the permanent magnet 13 and the support member 17 for the permanent magnet 13 are approximately the same as those shown in FIG. 19(a), explanation will be focused on the differences. The support member 17 has no thread portions for fixing the resilient shape memory member 1 at both ends. The support member 17 is fixed to the stationary shaft 110. The outer diameters of the flange 171b and the permanent magnet 13 are smaller than the inner diameter of the resilient shape memory member 1, such that the resilient shape memory member 1 surrounding the permanent magnet 13 can freely be expanded and compressed.

The stationary shaft 110 has an external thread portion 110a at one end and a head 110b at the other end, and screwed into a nut 111 through the cylindrical frame 8. The head 110b and the nut 111 preferably have a hexagonal shape, etc. suitable for fastening. The stationary shaft 110 is preferably made of a nonmagnetic material such as a resin and Al, and more preferably made of a material with a small friction resistance to the bobbins 20, 20.

Stoppers 82, 82 for regulating the stop positions of the magnetic field generators 3a, 3b are formed on the inner surface of the cylindrical frame 8. The inner flanges 22a, 22a of the bobbins 20, 20 come into contact with the stoppers 82, 82. Though the stoppers 82, 82 may have any shapes, they are preferably annular flanges for durability. The outer diameters of the outer flanges 21a, 21a and the inner flanges 22a, 22a are slightly smaller than the inner diameter of the cylindrical frame 8, and the outer diameters of the inner flanges 22a, 22a are larger than the inner diameters of the stoppers 82, 82. The cylindrical frame 8 has outlets 16, 16 for lead wires 31, 31. Further, as shown in FIG. 16, the cylindrical frame 8 may have windows 15 to prevent the accumulation of heat generated from the magnetic field generators 3a, 3b.

At the initial position shown in FIG. 20(a), at which the outer flanges 21a, 21a of the bobbins 20, 20 are in contact with the inner surfaces of the cylindrical frame 8 with no magnetic fields applied, the resilient shape memory member 1 is preferably a compression coil spring. In this actuator, only one of the magnetic field generators 3a, 3b may be energized to move. The moving directions of the movable members are changeable by selecting the energization directions of the magnetic field generators 3a, 3b. Take a case where the magnetic field generators 3a, 3b are energized such that their opposite magnetic poles face each other, for example. When the poles of the permanent magnet 13 face the different poles of the magnetic field generators 3a, 3b, both generators 3a, 3b are attracted to the permanent magnet 13. On the other hand, when the poles of the permanent magnet 13 face the same poles of the magnetic field generators 3a, 3b, both generators 3a, 3b are repelled from the permanent magnet 13. In a case where the magnetic field generators 3a, 3b are energized such that magnetic poles with the same polarity face each other, one of the generators 3a, 3b approaches the permanent magnet 13, the other being separated therefrom. Explanation will be focused below on the case where the magnetic field generators 3a, 3b are energized with opposite magnetic poles facing each other.

When the magnetic field generators 3a, 3b shown in FIG. 20(a) are energized such that the magnetic field generator 3a has a north pole inside and the magnetic field generator 3b has a south pole inside, the magnetic field generators 3a, 3b are attracted to the permanent magnet 13 and moved inward. Thus, the resilient shape memory member 1 is compressed. When the magnetic field generators 3a, 3b are further moved inward, the flanges 22a, 22a come into contact with the stoppers 82, 82 so that they are stopped as shown in FIG. 20(b). When the magnetic field generators 3a, 3b are de-energized, they are returned to the stop positions shown in FIG. 20(a) by the action of the resilient shape memory member 1.

FIG. 21 is a cross-sectional view showing a still further specific example of the actuator of the present invention. The actuator comprises a pair of coil-spring-shaped, resilient shape memory members 101, 102, a magnetic field generator 3 such as an electromagnetic coil disposed between the inner ends of the resilient shape memory members 101, 102, a pair of ring-shaped permanent magnets 13a, 13b fixed to the outer ends of the resilient shape memory members 101, 102, movable members 30a, 30b comprising the permanent magnets 13a, 13b, shafts 11a, 11b fixed to the movable members 30a, 30b, and a cylindrical frame 8 covering them. Flanges 21a, 22a of the supporting member for the magnetic field generator 3 are fixed to the cylindrical frame 8 by fasteners 32 such as screws. The structure of the supporting member is approximately the same as that of FIG. 13. Though this actuator may have soft magnetic bodies instead of the permanent magnets 13a, 13b, explanation will be focused below on the case of using the permanent magnets 13a, 13b.

The movable members 30a, 30b comprise the permanent magnets 13a, 13b and support members 17, 17 for fixing the permanent magnets 13a, 13b. The movable members 30a, 30b are approximately the same as that of FIG. 19(a), except that the support members 17, 17 have external thread portions and nuts 173, 173 for fixing the resilient shape memory members 101, 102 only inside.

In a case where the permanent magnets 13a, 13b are arranged with opposite magnetic poles facing each other in this actuator, both movable members 30a, 30b are attracted or separated simultaneously. In a case where the permanent magnets 13*a*, 13*b* are arranged with the same magnetic poles facing each other, the movable members 30*a*, 30*b* are moved in the same direction. Explanation will be focused below on the case where the permanent magnets 13*a*, 13*b* are arranged with opposite magnetic poles facing each other.

As shown in FIG. 21(*a*), the shafts 11*a*, 11*b* extending though the bores of the permanent magnets 13*a*, 13*b* are movably supported by bearings 14, 14 provided in the cylindrical frame 8 and fixed by screw members 174, 174. The inner end portion of the resilient shape memory member 101 passing through a groove 21*b* of a bobbin body 21 is wound on a large-diameter portion 21*d* of the body 21 in the same manner as in FIG. 13. The inner end portion of the resilient shape memory member 102 passing through a groove 22*b* of the flange 22*a* of an attachment 22 is wound on a large-diameter portion 22*d* of the attachment 22 in the same manner as in the resilient shape memory member 101. The outer end portions of the resilient shape memory members are fixed to the external thread portions of the support members 17, 17 by the nuts 173, 173 as shown in FIG. 19(*a*). The cylindrical frame 8 comprises an outlet 16 for a lead wire 31 of the magnetic field generator 3. Further, as shown in FIG. 16, the cylindrical frame 8 may have windows 15 to prevent the accumulation of heat generated from the magnetic field generator 3.

Stoppers 81, 81 for regulating the initial positions of the movable members 30*a*, 30*b* when no magnetic field is applied, and stoppers 82, 82 for regulating the stop positions of the driven movable members 30*a*, 30*b* are formed on the inner surface of the cylindrical frame 8. It is preferred that the flanges 171*b*, 171*b* of the magnet support members 17 come into contact with the stoppers 81, 81 and the stoppers 82, 82. The stoppers 81, 81, 82, 82 are preferably annular flanges for the reasons mentioned above. The outer diameters of the flanges 171*b*, 171*b* are approximately the same as the inner diameter of the cylindrical frame 8, and the movable members 30*a*, 30*b* are movable in the cylindrical frame 8.

At the initial positions as shown in FIG. 21(*a*), at which the flanges 171*b*, 171*b* come into contact with the stoppers 81, 81, the resilient shape memory members 101, 102 are preferably compression coil springs.

When the magnetic field generator 3 shown in FIG. 21(*a*) is energized with a south pole on the right, the permanent magnets 13*a*, 13*b* are attracted to the magnetic field generator 3, so that the movable members 30*a*, 30*b* are moved inward. Thus, the resilient shape memory members 101, 102 are compressed. When the movable members 30*a*, 30*b* are further moved inward, the flanges 171*b*, 171*b* come into contact with the stoppers 82, 82 so that the movable members 30*a*, 30*b* are stopped as shown in FIG. 21(*b*). When the magnetic field generators 3*a*, 3*b* are de-energized, the movable members 30*a*, 30*b* are returned to the positions shown in FIG. 21(*a*) by the action of the resilient shape memory members 101, 102.

FIG. 22 is a cross-sectional view showing a still further specific example of the actuator of the present invention. This actuator comprises a coil-spring-shaped, resilient shape memory member 1, a pair of movable members 30*a*, 30*b* fixed to both ends 1*a*, 1*b* of the resilient shape memory member 1, ring-shaped permanent magnets 13*a*, 13*b* fixed to the movable members 30*a*, 30*b*, a stationary shaft 110 supporting a magnetic field generator 3 such as an electromagnetic coil, output rods 19, 19 fixed to the outside of the movable members 30*a*, 30*b*, and a cylindrical frame 8 covering them. Annular projections 21*c*, 22*c* of a bobbin 20 supporting the magnetic field generator 3 are fixed to the stationary shaft 110 by fasteners 32, 32 such as screws. The structure of the supporting member is approximately the same as that of FIG. 13. Though this actuator may have soft magnetic bodies instead of the permanent magnets 13*a*, 13*b*, explanation will be focused below on the case of using the permanent magnets 13*a*, 13*b*.

Because the movable members 30*a*, 30*b* are approximately the same as in FIG. 19(*a*), explanation will be focused below only on the differences. The support members 17, 17 have external thread portions and nuts 173, 173 for fixing the resilient shape memory member 1 only inside. Flanges 171*b*, 171*b* of the support members 17, 17 have internal thread portions 171*f*, 171*f*. The external thread portions 19*a* of the output rods 19, 19 are screwed into the internal thread portions 171*f*, 171*f*. With the support members 17, 17 not fixed to the stationary shaft 110, the movable members 30*a*, 30*b* are movable along the stationary shaft 110.

Preferred example of the output rods 19, 19, the stationary shaft 110, and the cylindrical frame 8 are approximately the same as those shown in FIG. 20.

Stoppers 81, 81 for regulating the initial positions of the movable members 30*a*, 30*b* when no magnetic field is applied, and stoppers 82, 82 for regulating the stop positions of the driven movable members 30*a*, 30*b* are formed on the inner surface of the cylindrical frame 8. Preferred examples of the stoppers 81, 81 for the initial positions and the stoppers 82, 82 for the stop positions are approximately the same as in FIG. 21.

At the initial positions as shown in FIG. 22(*a*), at which the flanges 171*b*, 171*b* are in contact with the stoppers 81, 81 with no magnetic fields applied, the resilient shape memory member 1 is preferably a compression coil spring. In a case where the permanent magnets 13*a*, 13*b* are arranged with opposite magnetic poles facing each other in this actuator, both movable members 30*a*, 30*b* are attracted or separated simultaneously. In a case where the permanent magnets 13*a*, 13*b* are arranged such that magnetic poles with the same polarity are facing, the movable members 30*a*, 30*b* are moved in the same direction. Explanation will be focused below on the case where the permanent magnets 13*a*, 13*b* are arranged with opposite magnetic poles facing each other.

When the magnetic field generator 3 shown in FIG. 22(*a*) is energized, the permanent magnets 13*a*, 13*b* are attracted to the magnetic field generator 3 so that the movable members 30*a*, 30*b* are moved inward. Thus, the resilient shape memory member 1 is compressed. When the movable members 30*a*, 30*b* are further moved inward, the flanges 171*b*, 171*b* come into contact with the stoppers 82, 82 so that the movable members 30*a*, 30*b* are stopped as shown in FIG. 22(*b*). When the magnetic field generator 3 is de-energized, the permanent magnets 13*a*, 13*b* are returned to the positions shown in FIG. 22(*a*) by the action of the resilient shape memory member 1.

The resilient shape memory members used in the actuator of the present invention may be made of shape memory alloys such as Ni—Ti alloys. The permanent magnets include Sr— or Ba—ferrite magnets, neodymium-iron-boron magnets, rare earth-cobalt magnets, etc.

EXAMPLES

The present invention will be explained in more detail referring to Examples below without intention of restricting the present invention thereto.

Example 1

A coil spring made of a Ni—Ti alloy was produced as a resilient shape memory member. The specifications of the coil spring are described below. The coil spring was subjected to a common heat treatment to achieve superelasticity.

Wire diameter: 1 mm,
Effective number of turns: 3,
Outer diameter: 11±0.1 mm,
Free length: 52±0.1 mm,
Pitch: 15 mm,
¾-turn closed ends at both ends: 3 times, and
Both ends: not ground.

Figure 23:
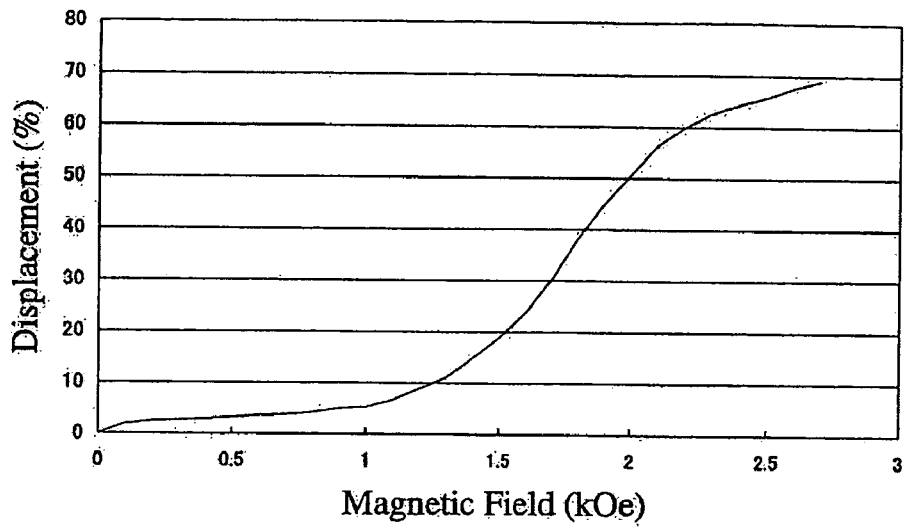
FIG. 23 is a graph showing the relation between the generated magnetic field and the displacement of a magnetic body in the actuator of Example 1.

A cylindrical magnetic body 2 (diameter: 11 mm, height: 10 mm) made of an Fe—Co alloy (51 atomic % Fe) was attached to one end of the coil spring, and electromagnetic coils 3 (number of turns: 1,200, diameter: 25 mm, length: 40 mm) were arranged as shown in FIG. 2(a), to produce an actuator. Current for energizing the electromagnetic coils 3 was increased to obtain the relation between a magnetic field generated and the displacement of the magnetic body 2. The results are shown in FIG. 23.

Example 2

Figure 24:
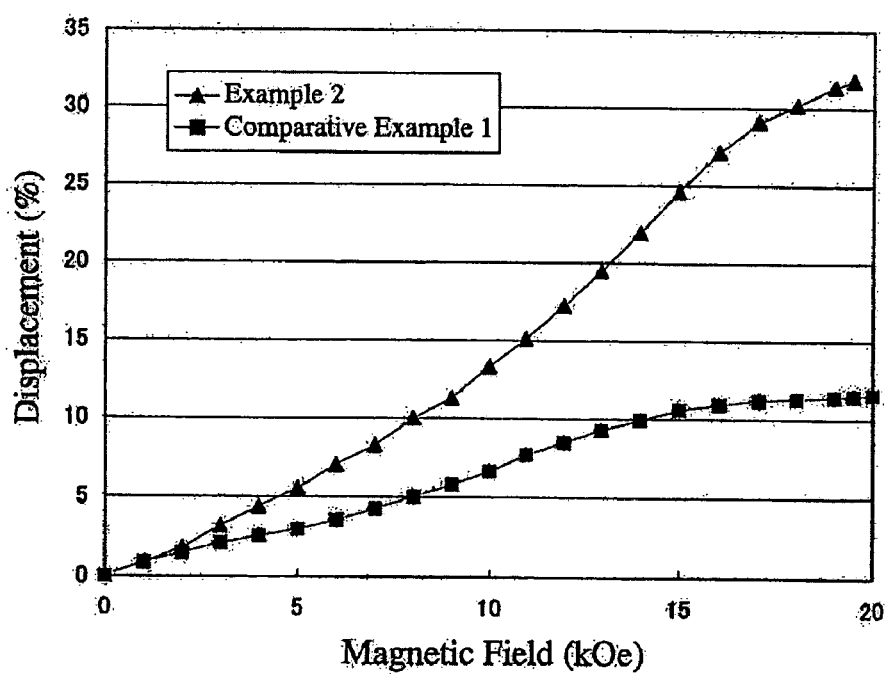
FIG. 24 is a graph showing the relation between the generated magnetic field and the displacement of a coil spring in the actuators of Example 2 and Comparative Example 1.

An actuator was produced in the same manner as in Example 1 except that the cylindrical magnetic body was not used and the entire coil spring was covered with a 200-μm-thick Fe—Ni alloy (44.6 atomic % Fe). The structure of the actuator obtained was substantially the same as that of FIG. 5. Current for energizing the electromagnetic coils 3 was increased to obtain the relation between a magnetic field generated and the displacement of the magnetic body 2. The results are shown in FIG. 24 by black triangles.

Comparative Example 1

An actuator having the structure shown in FIG. 2(a) was produced in the same manner as in Example 1 except for using a coil spring made of a magnetic shape memory alloy having a composition of Fe—$Pd_{30}$ (atomic %). Current for energizing the electromagnetic coils 3 was increased to obtain the relation between a magnetic field generated and the displacement of the magnetic body 2. The results are shown in FIG. 24 by black squares.

Table 1 shows the magnetic field applied, the maximum displacements of the coil springs, and the displacement change ratios of the actuators of Examples 1 and 2 and Comparative Example 1. The displacement change ratios were obtained by dividing the maximum displacements by the magnetic field applied.

TABLE 1

| No. | Maximum Displacement (%) | Magnetic Field (kOe) | Displacement Change Ratio (%/kOe) |
|---|---|---|---|
| Example 1 | 70.0 | 3 | 23.33 |
| Example 2 | 31.0 | 20 | 1.55 |
| Comparative Example 1 | 11.6 | 20 | 0.58 |

It is clear from Table 1 that the actuators of Examples 1 and 2 utilizing the superelasticity of the resilient shape memory member were better in the displacement and its change ratio in a smaller magnetic field than the magnetic drive actuator of Comparative Example 1.

APPLICABILITY IN INDUSTRY

The actuator of the present invention comprises a superelastic resilient shape memory member, a magnetic body disposed on at least part of the resilient shape memory member, and a magnetic field generator. The actuator is driven by a magnetic force of the magnetic field generator, and can be precisely controlled with excellent response. The actuator utilizes the superelasticity of a shape memory alloy, making it possible to provide large displacement and force in a small magnetic field.

What is claimed is:

1. An actuator, comprising a resilient shape memory member with superelasticity, a magnetic body, and a magnetic field generator, said magnetic field generator being fixed to said resilient shape memory member, such that one of said magnetic body and said magnetic field generator is stationary while the other is movable, whereby said movable member is moved by a magnetic field provided from said magnetic field generator, wherein said magnetic body is attached to an end of said resilient shape memory member, and wherein at least part of said resilient shape memory member is covered with said magnetic body.

* * * * *